(12) United States Patent
Matsumori et al.

(10) Patent No.: US 7,935,396 B2
(45) Date of Patent: May 3, 2011

(54) LIQUID CRYSTAL DISPLAY DEVICE

(75) Inventors: Masaki Matsumori, Hitachi (JP);
Yasushi Tomioka, Hitachinaka (JP);
Noboru Kunimatsu, Chiba (JP)

(73) Assignee: Hitachi Displays, Ltd., Chiba (JP)

( * ) Notice: Subject to any disclaimer, the term of this patent is extended or adjusted under 35 U.S.C. 154(b) by 953 days.

(21) Appl. No.: 11/621,218

(22) Filed: Jan. 9, 2007

(65) Prior Publication Data
US 2007/0160778 A1 Jul. 12, 2007

(30) Foreign Application Priority Data
Jan. 10, 2006 (JP) ................................ 2006-002373

(51) Int. Cl.
*C09K 19/56* (2006.01)
(52) U.S. Cl. .......... 428/1.2; 428/1.31; 349/97; 349/106; 349/124
(58) Field of Classification Search .................. 428/1.2, 428/1.26, 1.28, 1.3, 1.31; 349/97, 106, 123–124, 349/138
See application file for complete search history.

(56) References Cited

U.S. PATENT DOCUMENTS

| | | | | |
|---|---|---|---|---|
| 5,731,405 | A * | 3/1998 | Gibbons et al. ............... 528/353 |
| 5,751,389 | A * | 5/1998 | Andreatta et al. ............. 349/97 |
| 6,001,277 | A * | 12/1999 | Ichimura et al. ........... 252/299.4 |
| 6,169,591 | B1 * | 1/2001 | Kwon et al. .................. 349/124 |
| 6,368,760 | B1 | 4/2002 | Nishiguchi ...................... 430/20 |
| 6,512,559 | B1 * | 1/2003 | Hashimoto et al. ............. 349/74 |
| 6,995,506 | B2 * | 2/2006 | Ogawa ........................... 313/504 |
| 7,342,628 | B2 * | 3/2008 | Kim et al. ...................... 349/129 |
| 7,435,357 | B2 * | 10/2008 | Harding et al. ............ 252/299.1 |
| 7,718,234 | B2 * | 5/2010 | Tomioka et al. ............... 428/1.2 |
| 2002/0005928 | A1 * | 1/2002 | Hanakawa et al. ........... 349/149 |
| 2002/0034697 | A1 * | 3/2002 | Machiguchi et al. .............. 430/7 |
| 2002/0098295 | A1 * | 7/2002 | Yip et al. ....................... 427/487 |
| 2002/0132065 | A1 * | 9/2002 | Sahouani et al. .............. 428/1.2 |
| 2003/0071243 | A1 * | 4/2003 | Sahouani et al. .......... 252/299.4 |
| 2003/0081162 | A1 * | 5/2003 | Miller ........................... 349/129 |
| 2004/0048188 | A1 * | 3/2004 | Hatanaka et al. .......... 430/270.1 |
| 2004/0119933 | A1 * | 6/2004 | Harada et al. ................. 349/175 |

(Continued)

FOREIGN PATENT DOCUMENTS

JP 09-258212 10/1997

(Continued)

OTHER PUBLICATIONS

L. Silverstein, et al. "Thin Crystal Films (TCF) for LCD Color Correction", SID 03 Digest, pp. 824-827, 2003.

(Continued)

*Primary Examiner* — Sophie Hon
(74) *Attorney, Agent, or Firm* — Antonelli, Terry, Stout & Kraus, LLP.

(57) ABSTRACT

An object of the present invention is to provide a liquid crystal display device that has an excellent mass-productivity and gives an image improved by the reduction of the chromaticity difference between white display and black display, the reduction of coloring and luminance in black display, and the improvement of the contrast ratio. In the present invention, of a pair of alignment films 131 and 132 formed on a pair of substrates 101 and 102, respectively, the alignment film 132 formed on the glass substrate 102 on the observer side is made of a material obtained by adding a photoisomerized compound to a photosensitive polymer and has anisotropic absorption all over the visible light wavelength region (approximately 400 nm to 750 nm).

20 Claims, 7 Drawing Sheets

U.S. PATENT DOCUMENTS

| | | | |
|---|---|---|---|
| 2004/0165125 A1* | 8/2004 | Saida et al. | 349/96 |
| 2005/0003107 A1* | 1/2005 | Kumar et al. | 428/1.1 |
| 2005/0140837 A1* | 6/2005 | Crawford et al. | 349/42 |
| 2005/0140855 A1 | 6/2005 | Utsumi | |

FOREIGN PATENT DOCUMENTS

| | | |
|---|---|---|
| JP | 11-133431 | 5/1999 |
| JP | 2003-029724 | 1/2003 |
| JP | 2005-189569 | 7/2005 |
| JP | 2006-091393 | 4/2006 |
| JP | 2007-156322 | 6/2007 |

OTHER PUBLICATIONS

W. Gibbons, et al. "Surface-Mediated Alignment of Nematic Liquid Crystals with Polarized Laser Light" Letters to Nature, vol. 351, pp. 49-50, May 2, 1991.

* cited by examiner

LIQUID CRYSTAL DISPLAY DEVICE

BACKGROUND OF THE INVENTION

The present invention relates to liquid crystal display panel substrates having a member having anisotropic absorption, and liquid crystal display devices such as liquid crystal display panels using the substrates.

The range of use of liquid crystal displays is increasing because they are characterized, for example, in that they have a high display quality, are thin and consume only low electric power. In recent years, there is a growing demand for a good color reproducibility and a high contrast ratio with an increase of the range of use of the liquid crystal displays as mobile monitors (e.g. monitors for mobile phone and monitors for digital still camera), monitors for desktop personal computers, monitors for printing and design, medical monitors and liquid crystal televisions. Particularly in the case of the liquid crystal televisions, the presentation of a black color is considered very important and a high luminance is urgently required.

A taste for tone has a great influence on the image quality of the liquid crystal televisions. For example, in Japan, white display in the liquid crystal televisions is not set at achromatic display in chromatics but set so as to attain a high color temperature of 9300K or above 10000K in some cases.

In a liquid crystal display device using a pair of polarizing plates, white display and black display are markedly affected by the transmission characteristics of a perpendicular polarizing plate and a parallel polarizing plate as the polarizing plates used.

That is, a black color is affected by the perpendicular transmittance of the polarizing plates and a white color is affected by their parallel transmittance. A low perpendicular transmittance and a high parallel transmittance are required for attaining a high contrast ratio. In the case of polarizing plates obtained by incorporating iodine into a stretched poly (vinyl alcohol) resin, the contrast ratio in the shortwave region is often low. The reason is considered as follows: it is difficult to control the order parameters of the resin and iodine completely.

Therefore, transmitted light in the shortwave region, i.e., blue transmitted light is higher in black display and lower in white display as compared with transmitted light in the long-wave region. When white display is set so as to attain a high color temperature, namely, when it is set at a highly bluish white color, blueness is intensified in black display. This intensification is disadvantageous in the liquid crystal televisions in which the presentation of a black color is considered important.

As a means for solving the problem of the tone difference between black and white due to the above-mentioned polarizing plates, a tone correction polarizing-plate technique has been reported in the non-patent document 1 described below.

In addition, the correction of tones with low gradation in a liquid crystal display device in PVA mode is described in the patent document 1 described below.

Usually, display in a liquid crystal display device is carried out by applying an electric field to liquid crystal molecules in a liquid crystal layer held between a pair of substrates to change the direction of orientation of the liquid crystal molecules, and utilizing a change in the optical characteristics of the liquid crystal layer caused by the change of the direction of orientation. In so-called active-drive type liquid crystal display devices having a switching element (e.g. a thin-film transistor) for each pixel, an electrode has heretofore been provided on each of a pair of substrates holding a liquid crystal layer between them, so that the direction of an electric field to be applied to the liquid crystal layer may be substantially perpendicular to the boundary surface between the substrate and the liquid crystal layer. A display method adopted in the active-drive type liquid crystal display devices is represented by a twisted nematic (TN) display method in which display is carried out by utilizing the optical rotary power of liquid crystal molecules constituting the liquid crystal layer. In the liquid crystal display devices adopting this TN method, the narrow angle of field of view is considered the greatest problem.

On the other hand, IPS method has been developed in which an electric field generated by the use of an inter digital electrode formed on one of a pair of substrates is adjusted so as to have a component substantially parallel to the surface of the substrate having the inter digital electrode formed thereon, and liquid crystal molecules constituting a liquid crystal layer are rotated in a plane substantially parallel to the substrate, whereby display is carried out by utilizing the birefringence of the liquid crystal layer. This IPS method has advantages such as a wider angle of field of view and a lower load-carrying capacity because of the in-plane switching of the liquid crystal molecules as compared with the conventional TN method. Liquid crystal display devices adopting the IPS method are considered hopeful as novel liquid crystal display devices substituted for those adopting the TN method and have been in rapid progress in recent years. In addition, an IPS method has been developed in which the transmittance is improved by forming at least one of electrodes for applying an electric field to a liquid crystal layer, by the use of a transparent electroconductive film.

Such liquid crystal display devices adopting the IPS method (hereinafter referred to as "IPS-TFT-LCD"), which are excellent in visual angle characteristics (luminance contrast ratio, and gradation•tone inversion) and give a light display, are very useful in monitors and televisions, which have a large display region. On a pair of substrates holding a liquid crystal layer between them in the liquid crystal display device, an alignment film having an ability to control the orientation of liquid crystal molecules is formed on the boundary surface between each substrate and the liquid crystal layer. However, the development of novel structure and process for a large-sized display device (a large panel) is required for the practical application of IPS-TFT-LCD suitable for a larger screen of 20 inches or more.

Particularly in IPS-TFT-LCD having many level difference structures on the surfaces facing the liquid crystal layer, it is difficult to subject the alignment films to uniform alignment treatment all over a large screen. A margin in the case of subjecting the alignment films to the alignment treatment is remarkably narrower as compared with the conventional TN methods, in particular, a normally-open type TN method (light display at a low voltage and dark display at a high voltage) which is a leading method at present. The reason for the narrow margin is explained in the following items (1) to (3).

(1) As to the level difference structures: In IPS-TFT-LCD, a large number of long and narrow electrodes (referred to as inter digital electrodes in some cases) having a width of about several micrometers have to be provided in principle. Therefore, fine level difference structures are formed. The degree of the level difference depends on the thickness of the electrodes and the shapes of various films formed on the electrodes and is usually 10 nm or more. In a high-transmittance pixel structure, an inorganic insulating film is formed thick and level difference concavities and convexities having a thickness smaller than that of the inorganic insulating film are flattened to a certain degree. Accordingly, the level differences of the alignment film of the high-transmittance pixel structure are attributable mainly to electrodes on an organic insulating film. On the highest film among such films, an alignment film (referred to also as an alignment layer) made of a polymer film of polyimide or the like is formed.

In a conventional mass production technique, an ability to orient liquid crystal molecules (initial orientation) is imparted to the alignment film by subjecting the film to rubbing treatment. On the other hand, cloth for the rubbing is composed of a bundle of fine fibers with a thickness of approximately 10 to 30 μm. Substantially, each of the fine fibers gives a shearing force in a definite direction to the local portion of the alignment layer, whereby treatment for imparting the ability to orient liquid crystal molecules is carried out. As the fibers, there are very fine fibers of several microns, but cloth made of such very fine fibers has not been put to practical use because the cloth for rubbing is required to have stiffness for applying a certain degree of frictional force.

The distance between electrodes in the IPS method is also approximately 10 to 30 μm which is the same as the diameter of the above-mentioned fibers. Therefore, rubbing near the level difference is insufficient, so that the orientation tends to be disturbed. This disturbance of the orientation causes a rise of the black level and a lowering of the image quality (e.g. a decrease in contrast ratio and the nonuniformity of luminance) due to the rise.

(2) As to the angle of orientation: In IPS-TFT-LCD, the direction of initial orientation has to be set in principle so as to be different by a definite angle or more from a direction in which electrodes extend or a direction perpendicular thereto. Here, the electrodes refer to signal wiring electrodes, common electrodes in a pixel and pixel electrodes. In order to determine the direction of initial orientation by rubbing, rubbing with fibers of approximately 10 to 30 μm in a direction at a predetermined angle is necessary as described above. However, owing to the level difference between wirings extending in definite directions (e.g. the signal wiring electrodes, common electrodes in a pixel and pixel electrodes) and their ends, the fibers are drawn in the direction of the level difference from a preset angle, so that the orientation is disturbed, resulting in a lowering of the image quality, such as a rise of the black level.

(3) As to the sinking of a dark level: One of the characteristics of IPS-TFT-LCD is satisfactory sinking of a dark level (a black display). Therefore, the disturbance of orientation tends to be conspicuous as compared with other methods. In the conventional normally-open type TN method, the dark level is obtained when a high voltage is applied. In this case, at the high voltage, most liquid crystal molecules are aligned in the direction of an electric field which is a direction perpendicular to the surface of a substrate. Owing to the relationship between the alignment of the liquid crystal molecules and the location of a polarizing plate, the dark level is obtained. Accordingly, in principle, the uniformity of the dark level is not highly dependent on an initial orientation state at a low voltage. In addition, human eyes are sensitive to the variation of the dark level because they recognize the nonuniformity of luminance as the relative ratio between luminance values and response like a logarithmic scale. Also from this point of view, the conventional normally-open type TN method, in which liquid crystal molecules are forcedly aligned in one direction at a high voltage, is advantageous because of its insensitiveness to the initial orientation state.

On the other hand, the IPS method is sensitive to the disturbance of an initial orientation state because in this method, dark level display is carried out at low or zero voltage. Polarized light introduced into a liquid crystal layer is propagated with almost no disturbance of linear polarization particularly in the case of the following arrangement: a homogeneous alignment is employed in which the directions of orientation of liquid crystal molecules on upper and lower substrates, respectively, are parallel; the axis of light transmission of one of two polarizing plates is parallel to the direction of orientation of liquid crystal molecules; and that of the other is perpendicular to the direction of orientation (this arrangement is called a birefringence mode). This fact is effective in sinking the dark level. Transmittance T in the case of the birefringence mode can be generally expressed by the following equation:

$$T = T_0 \cdot \sin^2\{2\theta(E)\} \cdot \sin^2\{(\Pi \cdot d_{\mathit{eff}} \cdot \Delta n)/\lambda\}$$

Here, $T_0$ is a coefficient and is a numerical value determined mainly by the transmittance of the polarizing plate used in a liquid crystal panel; $\theta(E)$ is an angle between the direction of orientation of liquid crystal molecules (the effective optical axis of the liquid crystal layer) and the axis of transmission of polarized light; E is the intensity of an electric field applied; $d_{\mathit{eff}}$ is the effective thickness of the liquid crystal layer; $\Delta n$ is the refractive index anisotropy of the liquid crystals; and $\lambda$ is the wavelength of light. In addition, here, the product of the effective thickness $d_{\mathit{eff}}$ of the liquid crystal layer and the refractive index anisotropy $\Delta n$ of the liquid crystals, namely, $d_{\mathit{eff}} \cdot \Delta n$ is referred to as retardation. The thickness $d_{\mathit{eff}}$ of the liquid crystal layer in this case corresponds not to the thickness of the whole liquid crystal layer but to the thickness of a portion of the liquid crystal layer which is actually changed in the direction of orientation when a voltage is applied thereto. This is because liquid crystal molecules near the boundary surface of the liquid crystal layer are not changed in the direction of orientation owing to the influence of anchoring on the boundary surface even when a voltage is applied thereto. Therefore, when the thickness of the whole liquid crystal layer held between substrates is taken as dLC, there is always the relationship $d_{\mathit{eff}} < dLC$ between the thickness dLC and $d_{\mathit{eff}}$ and the difference between them can be estimated at approximately 20 nm to 40 nm though it varies depending on the kind of a liquid crystal material used in the liquid crystal panel and the kind of a boundary surface in contact with the liquid crystal layer, for example, a material for alignment film.

As is clear from the above equation, the term $\sin^2\{2\theta(E)\}$ is dependent on the intensity of electric field, and the luminance can be adjusted by varying the angle $\theta$, depending on the intensity of electric field E. In the case of normally-close type, a polarizing plate is set so that the angle $\theta$ may become zero when no voltage is applied. Therefore, such a method becomes sensitive to the disturbance of the direction of initial orientation.

Thus, in the IPS method, the uniformity of orientation is a very important factor and problems in the rubbing method adopted at present are becoming clear. In general, rubbing alignment treatment involves many problems concerning a rubbing treatment method, such as TFT damage caused by static electricity generated by friction, unsatisfactory display due to the disturbance of orientation caused by the disarray of the ends of fibers of rubbing cloth and dust, and frequent replacement of the rubbing cloth. In order to solve these problems in the rubbing alignment treatment, a so-called "rubbingless alignment method" is investigated and various methods have been proposed. As such a method, a photo-alignment method has been proposed in which liquid crystal molecules are oriented without rubbing treatment by irradiating the surface of a polymer film with polarized ultraviolet light or the like.

As an example of the photo-alignment method, the method disclosed in the non-patent document 2 described below is characterized by orienting liquid crystal molecules in a definite direction by irradiation with polarized light without requiring conventional rubbing treatment. This photo-alignment method is free from problems in the rubbing method, such as scratches on the film surface and static electricity and is advantageous in that it is simpler as a production process when industrial production is taken into consideration. Therefore, it is noted as a novel method for liquid crystal molecular alignment treatment which uses no rubbing treatment.

As to a material for a liquid crystal molecular alignment layer, employment of a high-molecular weight compound obtained by introducing a photoreactive group into the side chain of a polymer has been proposed in order to attain photochemical sensitivity to polarized light. A typical example of the high-molecular weight compound is a poly (vinyl cinnamate). In this case, it is considered that the poly (vinyl cinnamate) exhibits anisotropy in a polymer film owing to dimerization in the side chain portion by light irradiation to orient liquid crystal molecules. In addition, it has been reported that liquid crystal molecules are oriented by irradiating a specified polyimide film with polarized ultraviolet light or the like. In this case, it is considered that the liquid crystal molecular orientation is caused by the decomposition of the polyimide main chain in a definite direction by the light irradiation.

Moreover, it has been proposed that liquid crystal molecules can be oriented in a definite direction by dispersing a low-molecular weight dichromatic azo dye in a polymeric material and irradiating the surface of such a film with polarized light. As to this technique, there is the following patent document 2.

Patent document 1: JP-A-2003-29724
Patent document 2: JP-A-11-133431
Non-patent document 1: SID 03 p. 824-827
Non-patent document 2: W. M. Gibbons et al., Nature, 351, 49 (1991)

As described above, as to the display characteristics of a liquid crystal display device using polarizing plates, the tones of a black display and a white display are remarkably influenced mainly by the difference in spectral characteristics between the perpendicular transmittance and parallel transmittance of the polarizing plates. In particular, the black display is remarkably influenced by the spectral characteristics of the polarizing plates when the polarizing plates are perpendicular to each other. Iodine stretching type polarizing plates commonly used at present are disadvantageous in that they cannot shut out light at about 400 nm completely when they are perpendicular to each other, so that bluishness is shown.

The above-mentioned patent document 1 discloses a technique in which tones are corrected by controlling three pixels of RGB independently. However, in order to achromatize blue transmitted light, green and red transmitted lights have to be increased. When such a method is adopted in black display, the luminance of the black display is increased, so that the contrast ratio is unavoidably decreased. Therefore, the induction of an increase in the luminance of the black display and a decrease in the contrast ratio are not allowable in a liquid crystal television in which the presentation of a black color is considered important. In addition, displaying a black color at different orientation states of crystal liquid molecules in the pixels, respectively, of RGB becomes a cause for the deterioration of characteristics concerning the angle of field of view. Therefore, the above-mentioned technique is not desirable also in this point.

In the above-mentioned non-patent document 1, a dye showing dichromatism in a shortwave range is located outside each of a pair of polarizing plates to make the perpendicular transmittance characteristics of the polarizing plates into those corresponding to achromatism. However, in the tone correction polarizing plate for the achromatization, four polarizing layers are formed and hence processes for adjusting the axes of the individual layers are necessary, so that the load on the production process is unavoidably increased. Moreover, it is also disadvantageous from the viewpoint of productivity that the nonuniformity of the degree of polarization of the polarizing plates results in a nonuniform display quality.

In the above-mentioned tone correction polarizing-plate technique, since there is the influence of the abolishment of polarization by the lowering of the degree of orientation of the dye, the dye cannot be located inside the polarizing plates, namely, the dye cannot be located on a substrate.

In general, a liquid crystal display device is based on the following principle: the polarized state of linear polarized light transmitted by a polarizing plate on the incident light side is changed by a change in the direction of molecular orientation of a liquid crystal layer to control the amount of light transmitted by a polarizing plate on the emerging light side, whereby display is carried out. Ideally, the polarized state is not changed by the liquid crystal layer at all at the time of black display and light from a light source is shut out by the polarizing plate perpendicularly located on the emerging light side.

Therefore, the black display becomes the product of the perpendicular spectral transmittance of the polarizing plate used and the spectral transmittance of a color filter. In detail, although absorption by the substrates, an insulating layer and a transparent electrode occurs, absorption by the polarizing plates and the color filter is substantially dominant. An intermediate tone and a white color obtained by the transmission of light are displayed by the transmission of birefringent light generated by the liquid crystal layer, by the polarizing plate on the emerging light side. Therefore, the white color display is substantially dominantly affected by the parallel spectral transmittance of the polarizing plate used, the birefringent light of the liquid crystals and the spectral transmittance of the color filter.

However, since the degree of polarization of a polarizing plate obtained by incorporating iodine into a stretched poly (vinyl alcohol) resin is lowered in the shortwave region, blue coloration is caused in a black display and transmission for blue is lowered in white display. On the other hand, in a black display, the appearance of leaked light due to light scattering caused by pigment particles forming the color filter layer and the liquid crystal layer is also a cause for a luminance increase and a tone change from the luminance and tone of an ideal black display.

In the above-mentioned patent document 2, a pre-tilt angle is tried to attain by forming a poly(vinyl alcohol) thin film containing an azo dye as an alignment film and aligning molecules of the azo dye slantingly.

However, in the case of the IPS method, the pre-tilt angle of liquid crystal molecules induces asymmetry with respect to the dependence of contrast ratio and chromaticity change on the angle of field of view. Therefore, the absence of the pre-tilt angle is preferable. In the case of irradiation of the poly(vinyl alcohol) thin film containing the azo dye with polarized light, a force for orienting liquid crystal molecules in a desired direction, i.e., orientation-regulating force (referred to also as anchoring strength) is insufficient. Moreover, a considerable irradiation dose is necessary in order to attain a sufficient orientation-regulating force by an existing photo-alignment technique, and this technique requires a longer working process time than does the rubbing method. Therefore, this technique involves a serious problem also from the viewpoint of productivity.

The present invention permits not only reduction of the chromaticity difference between white display and black display, i.e., the above-mentioned problem but also improvement of the contrast by the reduction of the luminance of a black display, by introducing a layer having anisotropic absorption besides the polarizing plates of a liquid crystal display device. Furthermore, the present invention is effective in compensating for the lowering of the degree of polarization of the polarizing plates and hence aims also at increasing the production margin for the nonuniformity of the degree of polarization of the polarizing plates in addition to the improvement of the image quality.

SUMMARY OF THE INVENTION

In order to solve the problems described above, the present invention is characterized by providing at least one optical layer having anisotropic absorption (at least one anisotropic absorption layer) in a light path along which light emitted from or introduced into a light source passes through the optical system of a liquid crystal display device to be recognized by an observer. The anisotropic absorption layer is characterized by compensating for the lowering of the degree of polarization of polarizing plates and the change of tones at the time of black display and white display. Moreover, the anisotropic absorption is effective in improving the contrast ratio by reducing the luminance at the time of black display because the lowering of the degree of polarization of the polarizing plates can be compensated for by making the axis of absorption of the anisotropic absorption substantially parallel or perpendicular to the axis of absorption of the polarizing plate on the incident light side or the emerging light side.

In particular, the degree of the anisotropic absorption is preferably as high as possible all over the visible light wavelength region (approximately 400 nm to 750 nm) and is effective as much in improving the contrast ratio of the liquid crystal display device. When an iodine-containing polarizing plate is used as the polarizing plate of the liquid crystal display device, the degree of polarization of the iodine-containing polarizing plate in the vicinity of 400 to 450 nm is lower than in the other visible light wavelength region, and hence the anisotropic absorption layer preferably has a higher degree of anisotropic absorption in the wavelength region of approximately 400 to 450 nm. By the possession of the higher degree of anisotropic absorption, the anisotropic absorption layer can reduce bluishness at the time of black display.

The present invention is characterized by imparting anisotropic absorption to alignment films. Specifically, a dichromatic compound capable of undergoing photoisomerization, such as an azobenzene derivative or a stilbene derivative is added to the alignment films. The photoisomerization is caused by irradiating the dichromatic compound with substantially linearly polarized light, to impart anisotropic absorption to the alignment films.

Here, the dichromatic compound is preferably as follows. Its chemical structure is a long linear rod-like structure, the aromatic ring constituting the compound has iso-planar properties, and the number of groups participating in hydrogen bonds in the compound is small. Typical examples of the dichromatic compound are polyazo direct dyes, C.I. Direct Yellows 12 and 44, C.I. Direct Orange 39, C.I. Direct Reds 23, 28, 31, 37, 79 and 81, C.I. Direct Violets 9 and 12, C.I. Direct Blues 1, 22, 78, 90 and 151, C.I. Direct Green 1, C.I. Direct Black 17, Methyl Orange, Brilliant Yellow, Modern Yellow 10, Acid Red 97, etc. Of these, compounds containing a benzidine type, diphenylurea type, stilbene type, dinaphthylamine type, J-acid type or anthraquinone type structure are preferable.

The present invention is characterized by adding such compounds in combination so that the lowering of the degree of polarization of the polarizing plates and the change of tones may be compensated for.

In addition, the present invention is characterized by using in alignment films a material capable of being endowed with orientation-controlling ability by irradiation with substantially linearly polarized light. Since the above-mentioned dichromatic compound has an ability to orient liquid crystal molecules in a direction perpendicular to the axis of polarization of polarized light as irradiation light owing to photoisomerization, photosensitive alignment films having the same characteristics as above are preferable. Particularly when the alignment films are made of a photosensitive polyimide or poly(amic acid) having cyclobutane rings, they can be obtained as alignment films having a high orientation-regulating force, at a low irradiation dose. Therefore, such alignment films are effective also from the viewpoint of productivity.

Photoisomerizable compounds such as azobenzene derivatives and stilbene derivatives react at a wavelength near the visible region, many of them have a relatively low molecular weight, and they are highly reactive. Therefore, they are disadvantageous in that the long-term reliability of a product is low when they are used in the alignment films of a liquid crystal display device.

In the present invention, such low-molecular weight compounds are used by their addition to a photosensitive (photoreactive) polyimide and/or a photosensitive (photoreactive) poly(amic acid) to fix the oriented state of molecules of the photoisomerizable compound. This fixation is effective also from the viewpoint of product reliability.

In order to vary tones at the time of black display and white display in a liquid crystal display device, a layer having optical anisotropy has to be introduced. In the present invention, this problem is solved by imparting the optical anisotropy, in particular, anisotropic absorption to alignment films and/or the insulating film of an active element for applying an electric field to liquid crystals and/or a color filter layer and/or an organic film such as a color filter protective insulating film.

Specifically, the above purpose is achieved by adding dichromatic dyes such as stilbene derivatives or azobenzene derivatives to alignment films and/or the insulating film of an active element for applying an electric field to liquid crystals and/or a color filter layer and/or a color filter protective insulating film, and irradiating such a layer(s) with substantially linearly polarized light.

By thus introducing a layer(s) having anisotropic absorption into a liquid crystal display device, it is possible to achieve the improvement of the degree of polarization by assistance to the degree of polarization of polarizing plates, compensation for the nonuniformity of the degree of polarization, and the reduction of the luminance and bluishness of a black display by the absorption of leaked light.

In the present invention, when a dichromatic compound is added to a color filter layer to impart dichroism, it is more effective to make the transmission wavelength region of the color filter layer substantially the same as the absorption wavelength region of the dichromatic compound. When such an anisotropic absorption is present on a substrate on the observer side, the change of tones at the time of black display can be compensated for without a marked change of tones at the time of white display by making the axis of absorption of the anisotropic absorption substantially parallel to the axis of absorption of a polarizing plate located on the observer side. Thus, the invention is effective. When the aforesaid anisotropic absorption is present on a substrate on the light source side, the long-term stability of orientation-regulating force can be attained by making the axis of absorption of the anisotropic absorption substantially parallel to the axis of absorption of a polarizing plate located on the light source side. Thus, the present invention is effective.

In the present invention, as a light source, there may be used light-emitting units such as cold-cathode tubes (CCFL), light-emitting diodes (LED) and organic electroluminescence (OLED); and light sources using natural light such as the sunlight. As the light-emitting units, a plurality of units capable of emitting lights of different wavelengths, respectively, such as red, blue and green lights may be used in combination. As to the position of the light source, the present invention is effective even when the light source is just under, on the side of or in front of a liquid crystal panel with respect to the observer side.

When the direction of major axis of liquid crystal molecules forming a liquid crystal layer is parallel to a pair of substrates holding the liquid crystal layer between them, making of a pre-tilt angle can be prevented by the present invention, and the dependence of contrast ratio and chromaticity change on the angle of field of view is symmetric. Therefore, the present invention is effective in improving the display quality.

As described above, the present invention permits reduction of bluishness at the time of black display in a liquid crystal display device, improvement of the contrast ratio including the angle of field of view, improvement of the product reliability and improvement of the productivity.

As explained above, according to the present invention, the problem of bluishness at the time of black display in a liquid crystal display device can be solved, and there can be provided a liquid crystal display device that is excellent in mass-productivity and has a high image quality with an improved contrast ratio.

Other objects, features and advantages of the invention will become apparent from the following description of the embodiments of the invention taken in conjunction with the accompanying drawings.

Figure 1:
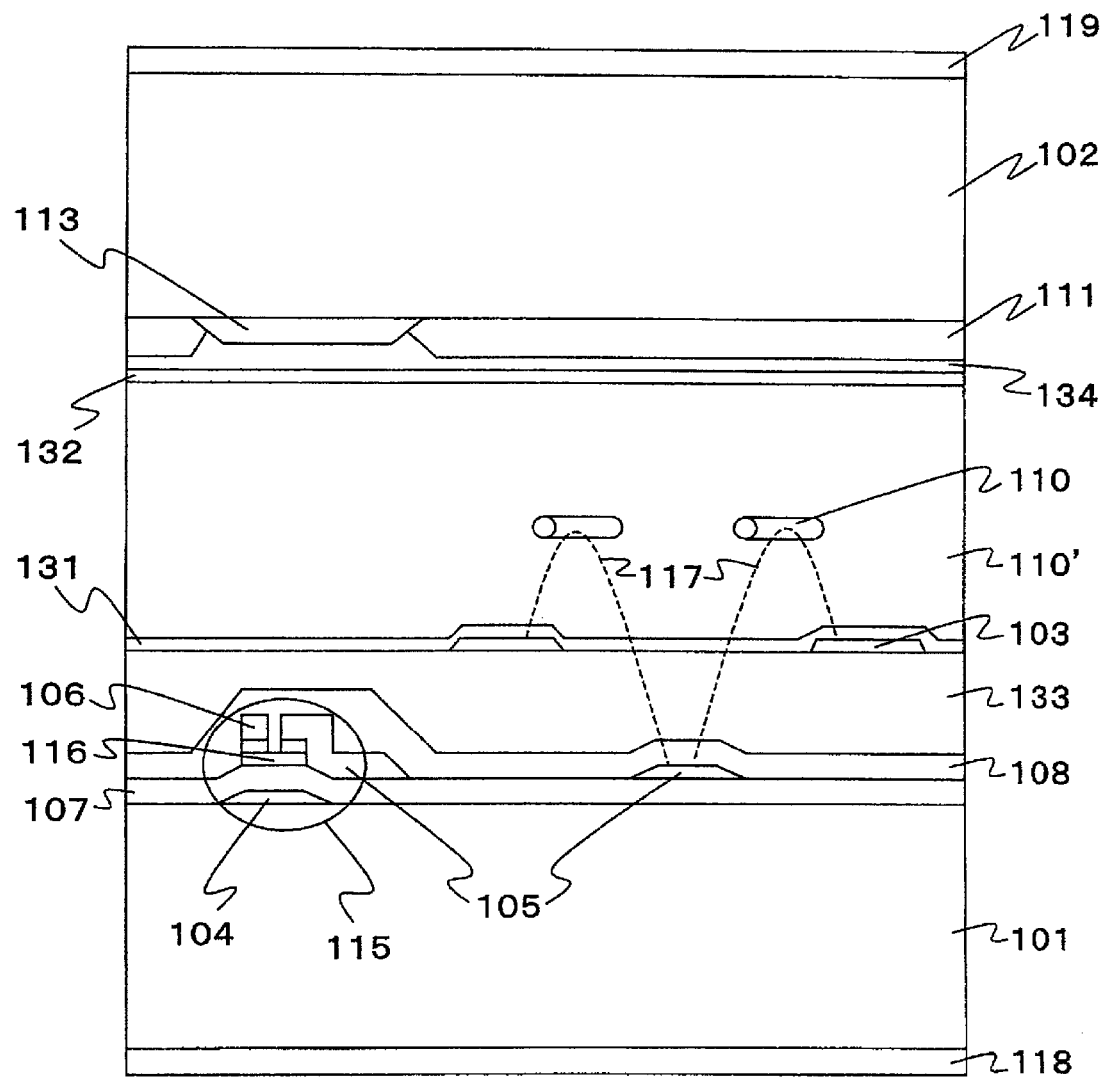
FIG. 1 is a cross-sectional view of a pixel portion in a first embodiment of the liquid crystal display device of the present invention.

DESCRIPTION OF REFERENCE NUMERALS 101 and 102 - - - glass substrates, 103 - - - common electrode, 104 - - - scanning wiring (gate electrode), 105 - - - pixel electrode (source electrode), 106 - - - signal wiring (drain electrode), 107 - - - gate insulating film, 108 - - - protective film, 110 - - - liquid crystal molecule, 110' - - - liquid crystal layer (liquid crystal composition layer), 111 - - - color filter, 113 - - - shade film (black matrix), 115 - - - thin-film transistor, 116 - - - semiconductor film, 117 - - - direction of electric field, 118 and 119 - - - polarizing plates, 120 - - - common electrode wiring, 131 and 132 - - - alignment films, 133 and 134 - - - organic insulating films.

DETAILED DESCRIPTION OF THE INVENTION

The embodiments of the present invention are explained below with reference to the drawings. In the following description, a substrate having active elements (e.g. thin-film transistors) formed thereon is referred to as an active-matrix substrate. When a substrate facing the aforesaid substrate has a color filter, it is referred to also as a color filter substrate. A group of electrodes for driving liquid crystals are explained by taking the case of those formed on an active-matrix substrate in an IPS method, though they may be formed on both substrates holding liquid crystals between them.

In the present invention, a preferable contrast as a target is more than 500:1 and an afterimage disappearance time as a target is preferably 5 minutes or less. The afterimage disappearance time is determined by the method defined in the following embodiments.

First Embodiment

Figure 2A:
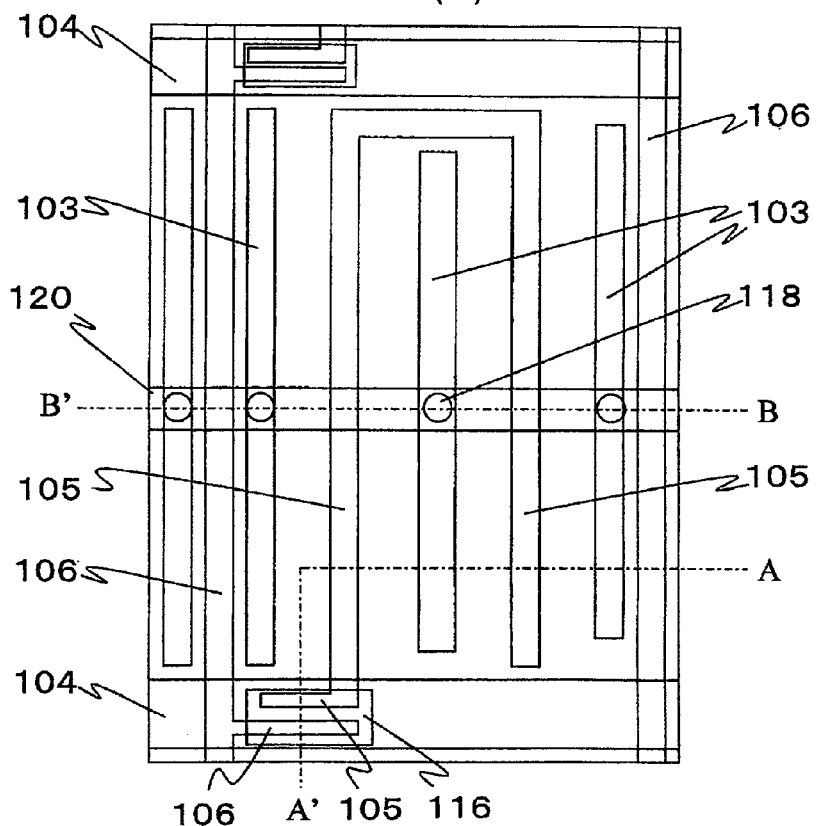
FIGS. 2(a), 2(b) and 2(c) are a plan view and cross-sectional views of a pixel portion in the first embodiment.
Figure 2B:
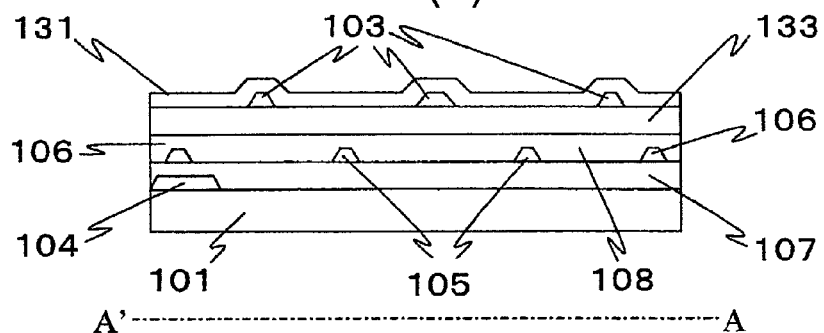
Figure 2C:
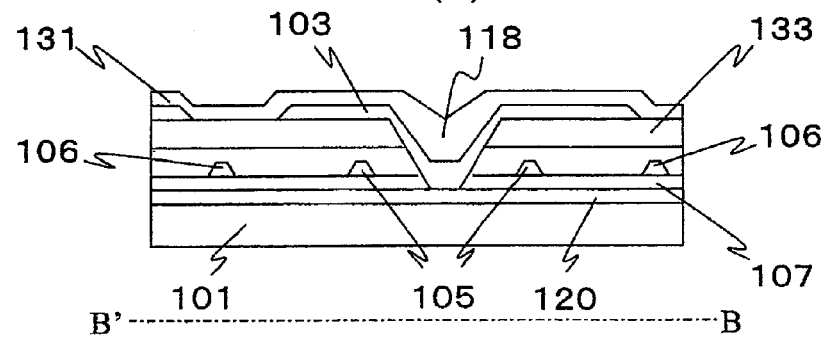

FIG. 1 is a schematic cross-sectional view of the vicinity of a pixel which illustrates a first embodiment of the liquid crystal display device of the present invention. FIG. 2 is schematic views of an active-matrix substrate for explanation of the structure of the vicinity of a pixel which illustrate the first embodiment of the liquid crystal display device of the present invention. FIG. 2(a) is a plan view, FIG. 2(b) is a sectional view taken along the line A-A' in FIG. 2(a), and FIG. 2(c) is a sectional view taken along the line B-B' in FIG. 2(a). FIG. 1 corresponds to a part of a section along the line A-A' in FIG. 2(a). The sectional views as FIG. 2(b) and FIG. 2(c) are schematic views in which the structure of the main portion is emphasized, and they do not correspond to the sections along the line A-A' and the line B-B', respectively, in FIG. 2(a) in an one-by-one manner. For example, in FIG. 2(b), a thin-film transistor 115 is not shown, and in FIG. 2(c), only a portion of a through-hole 118 connecting a common electrode 103 to a common wiring 120 is shown as a representative.

In the present embodiment, in order to obtain an active-matrix substrate, a scanning wiring (a gate electrode) 104 made of Cr (chromium) and a common wiring (a common electrode wiring) 120 are located on a glass substrate 101, and a gate insulating film 107 made of silicon nitride is formed so as to cover the gate electrode 104 and the common electrode wiring 120.

A semiconductor film 116 made of amorphous silicon or polycrystalline silicon is located on the gate electrode 104 through the gate insulating film 107 so as to function as the active layer of a thin-film transistor (TFT) 115 as active element.

A drain electrode (a signal wiring) 106 made of Cr.Mo (chromium/molybdenum) and a source electrode (a pixel electrode) 105 are located so as to overlap with a portion of the pattern of the semiconductor film 116, and a protective film 108 made of silicon nitride is formed so as to cover all of them.

As schematically shown in FIG. 2(c), common electrodes 103 connected to the common electrode wiring 120 through a through-hole 118 formed by perforation of the gate insulating film 107 and the protective film 108 are located on an organic insulating film 133. As can be seen from FIG. 2(a), the common electrodes 103 drawn out from the common electrode wiring 120 through the through-hole 118 are formed so as to face the pixel electrodes 105 in the region of one pixel in a plane.

Therefore, in the present embodiment, the pixel electrodes 105 are formed under the protective film 108 formed under the organic insulating film 133, and the common electrodes 103 are located on the organic insulating film 133. A pixel is formed in a region between a plurality of the pixel electrodes 105 and a plurality of the common electrodes 103. An alignment film 131 is formed on the surface of the active-matrix substrate having the thus formed unit pixels arranged thereon in the form of a matrix, namely, the surface of the organic insulating film 133 having the common electrodes 103 formed thereon.

On the other hand, as shown in FIG. 1, a color filter layer 111 is located on a glass substrate 102 as opposite substrate so as to be partitioned into sections for the individual pixels by a shade portion (a black matrix) 113, and the color filter 111 and the shade portion 113 are covered with an organic protective film 134 made of a transparent insulating material. In addition, an alignment film 132 is formed also on the organic protective film 134 to constitute a color filter substrate.

The alignment films 131 and 132 have an ability to orient liquid crystal molecules which has been imparted by irradiation with linear polarized ultraviolet light taken out from a high-pressure mercury lamp as light source by the use of a pile polarizer obtained by laminating quartz plates.

The glass substrate 101 constituting the active-matrix substrate and the glass substrate 102 constituting the color filter substrate are located so as to face each other with respect to the surfaces of the alignment films 131 and 132, respectively, and a liquid crystal layer (a liquid crystal composition layer) 110' composed of liquid crystal molecules 110 is located between the glass substrates, whereby a liquid crystal display device is constructed. Polarizing plates 118 and 119 are formed on the outer surfaces, respectively, of the glass substrate 101 constituting the active-matrix substrate and the glass substrate 102 constituting the color filter substrate.

Thus, an active-matrix type liquid crystal display device using TFT115 (namely, a TFT liquid crystal display device) is constructed. In this TFT liquid crystal display device, when no electric field is applied, the liquid crystal molecules 110 constituting the liquid crystal composition layer 110' are oriented substantially in parallel with the surfaces of the substrates 101 and 102 located so as to face each other, and are homogeneously oriented in an initial direction of orientation determined by photo-alignment treatment.

When TFT115 is switched on by applying a voltage to the gate electrode 104, an electric field 117 is applied to the liquid crystal composition layer 110' owing to the electric potential difference between the pixel electrodes 105 and the common electrodes 103, and the liquid crystal molecules 110 constituting the liquid crystal composition layer 110' turn in the direction of the electric field owing to the interaction between the dielectric anisotropy of the liquid crystal composition and the electric field. In this case, the light transmittance of the TFT liquid crystal display device is varied by the refraction anisotropy of the liquid crystal composition layer 110' and the action of the polarizing plates 118 and 119, whereby display can be carried out.

In the organic insulating films 133 and 134, there may be used thermosetting resins such as acrylic resins, epoxyacrylic resins and polyimide resins, which are excellent in insulating properties and transparency. Transparent photo-setting resins and inorganic materials such as polysiloxane resins may also be used in the organic insulating films 133 and 134. In addition, the organic insulating films 133 and 134 may serve also as the alignment film 132.

As described above, the present embodiment makes it possible to impart uniform orientation all over the display region without local disturbance near the electrodes by adopting a non-contact photo-alignment method, not a rubbing alignment treatment in which the ability to orient liquid crystal molecules of the alignment films 131 and 132 is imparted by direct rubbing with buff.

Second Embodiment

Figure 3:
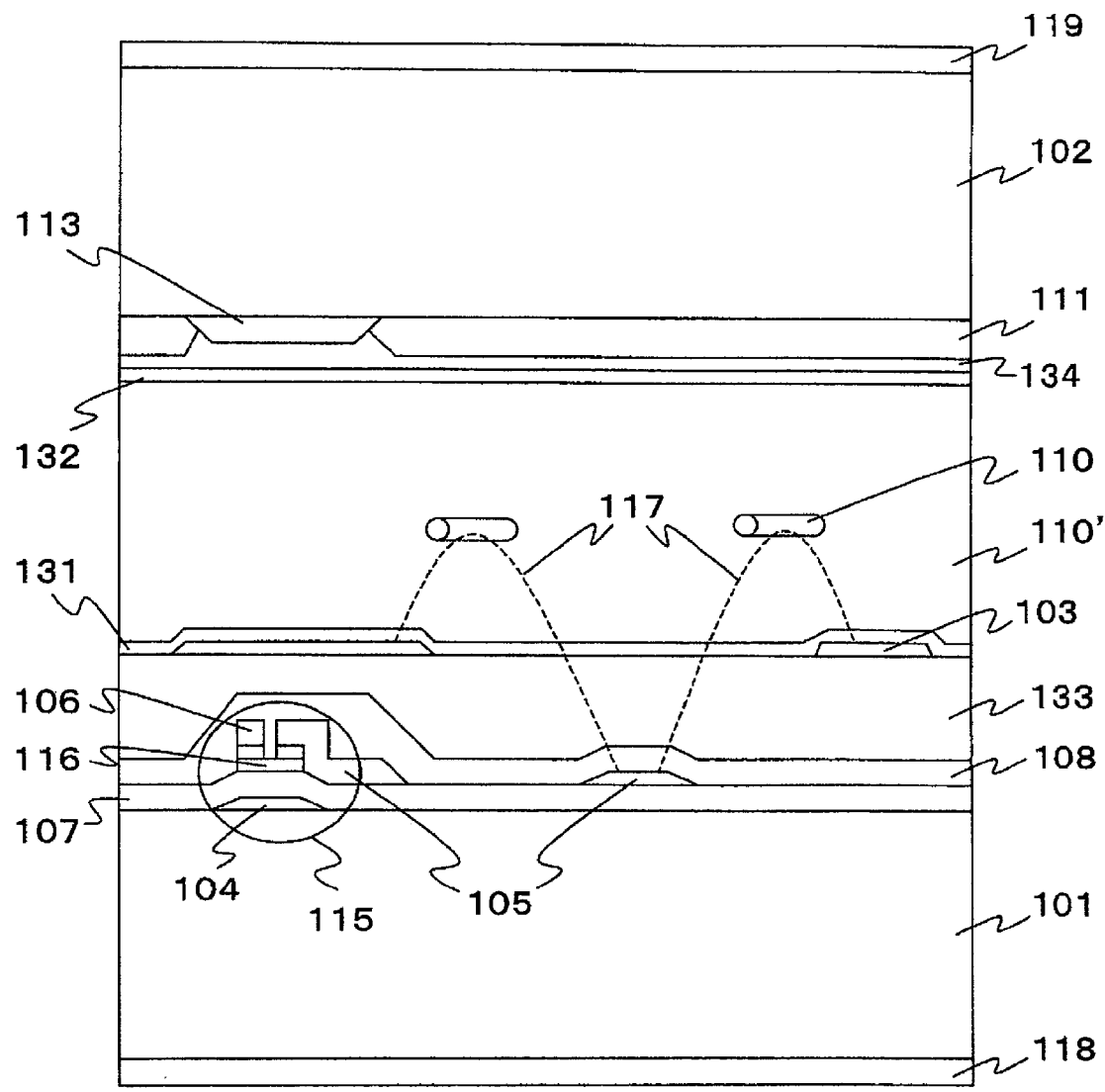
FIG. 3 is a cross-sectional view of a pixel portion in a second embodiment of the liquid crystal display device of the present invention.
Figure 4A:
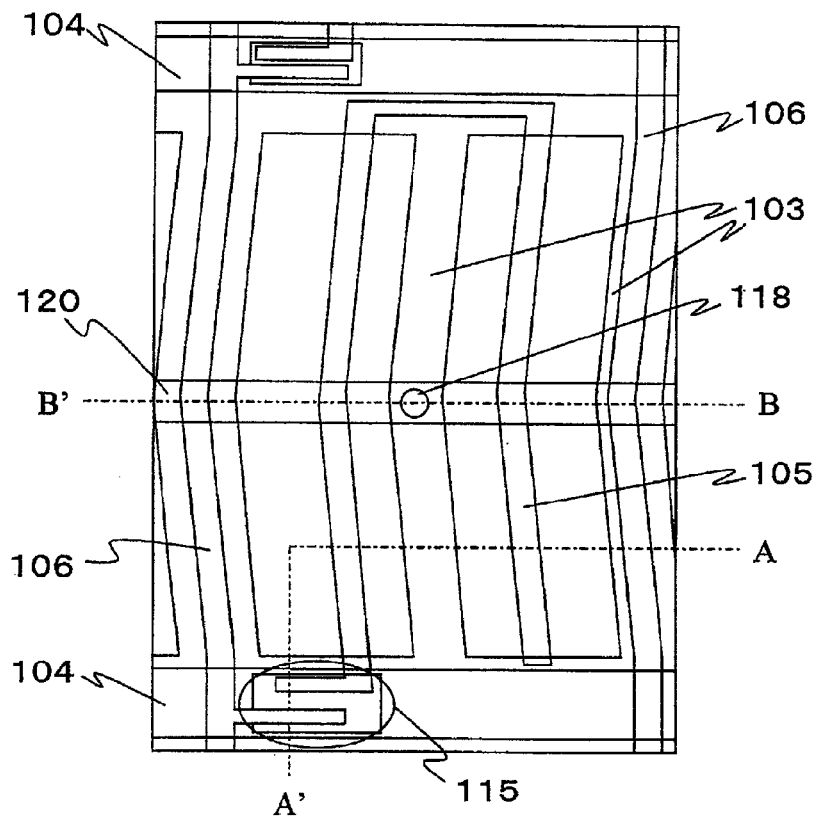
FIGS. 4(a), 4(b) and 4(c) are a plan view and cross-sectional views of a pixel portion in the second embodiment.
Figure 4B:
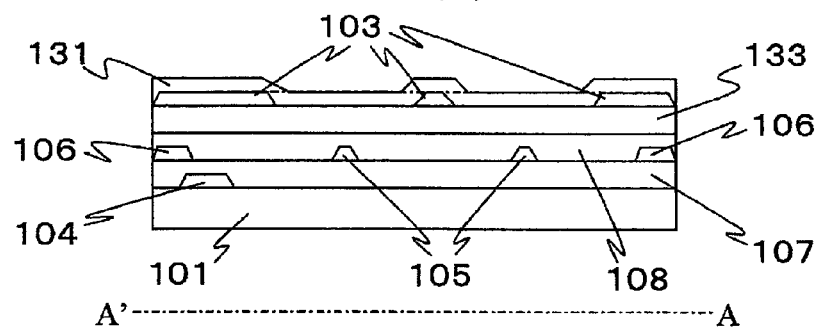
Figure 4C:
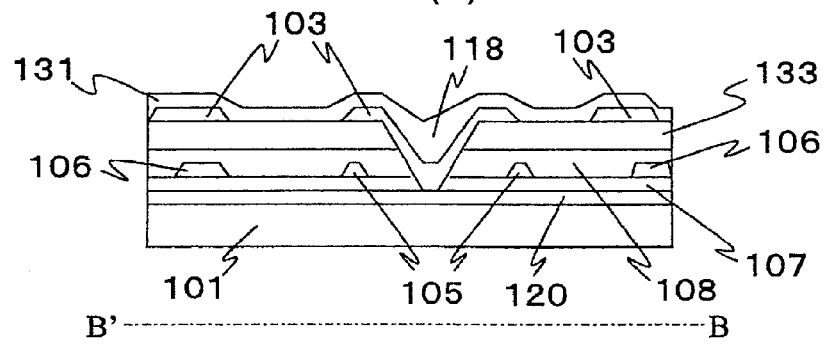

A second embodiment of the liquid crystal display device of the present invention is explained below. FIG. 3 is a schematic cross-sectional view of the vicinity of a pixel which illustrates the second embodiment of the liquid crystal display device of the present invention. FIG. 4 is schematic views of an active-matrix substrate for explanation of the structure of the vicinity of a pixel which illustrates the second embodiment of the liquid crystal display device of the present invention. FIG. 4(a) is a plan view, FIG. 4(b) is a sectional view taken along the line A-A' in FIG. 4(a), and FIG. 4(c) is a sectional view taken along the line B-B' in FIG. 4(a). FIG. 3 shows a part of a section along the line A-A' in FIG. 4(a). The sectional views as FIG. 4(b) and FIG. 4(c) are schematic views in which the structure of the main portion is emphasized, and they do not correspond to the sections along the line A-A' and the line B-B', respectively, in FIG. 4(a) in an one-by-one manner. For example, in FIG. 4(b), a thin-film transistor 115 is not shown.

In the present embodiment, a gate electrode 104 made of Cr and a common electrode wiring 120 are located on a glass substrate 101 which constitutes an active-matrix substrate, and a gate insulating film 107 made of silicon nitride is formed so as to cover the gate electrode 104 and the common electrode wiring 120.

A semiconductor film 116 made of amorphous silicon or polycrystalline silicon is located on the gate electrode 104 through the gate insulating film 107 so as to function as the active layer of a thin-film transistor (TFT) 115, an active element.

A drain electrode 106 made of Chromium.molybdenum and a source electrode (a pixel electrode) 105 are located so as to overlap with a portion of the pattern of the semiconductor film 116, and a protective film 108 made of silicon nitride is formed so as to cover all of them. An organic insulating film 133 is located on the protective film 108. The organic insulating film 133 is made of a transparent material such as an acrylic resin. The pixel electrode 105 is composed of a transparent electrode of ITO ($In_2O_3$:Sn) or the like. Common electrodes 103 are connected to the common electrode wiring 120 through a through-hole 118 passing through the gate insulating film 107, the protective film 108 and the organic insulating film 133.

The common electrodes 103 paired with the pixel electrodes 105, respectively, when an electric field for driving liquid crystals is applied, are formed so as to surround a pixel in a plane. The common electrodes 103 are located on the organic insulating film 133. The common electrodes 103 are located so as to hide the drain electrodes 106, the scanning wiring 104 and the thin-film transistor (TFT) 115 as active element which are located in lower layers when looked at from above, and they serve also as a shade layer for shading the semiconductor film 116 from light.

An alignment film 131 is formed on the surface of the glass substrate 101 constituting the thus constructed active-matrix substrate having unit pixels (a group of pixels) arranged thereon in the form of a matrix, namely, it is formed over the organic insulating film 133 and the common electrodes 103 formed thereon. On the other hand, also on a glass substrate 102 that constitutes a color filter substrate, an alignment film 132 is formed on an organic protective film 134 formed on a color filter layer 111.

As in the first embodiment, the alignment films 131 and 132 have an ability to orient liquid crystal molecules which has been imparted by irradiation with linear polarized ultraviolet light taken out from a high-pressure mercury lamp as light source by the use of a pile polarizer obtained by laminating quartz plates.

The glass substrate 101 and the opposite glass substrate 102 are located so as to face each other with respect to the planes on which the alignment films 131 and 132, respectively, have been formed, and a liquid crystal composition layer 110' composed of liquid crystal molecules 110 is located between the glass substrates, whereby a liquid crystal display device is constructed. Polarizing plates 118 and 119 are formed on the outer surfaces, respectively, of the glass substrate 101 and the opposite glass substrate 102.

Thus, also in the present embodiment, as in the first embodiment described above, the pixel electrodes 105 are located under the organic insulating layer 133 and the protective layer 108, and the common electrodes 103 are located over the pixel electrodes 105 and the organic insulating film 133. When the electric resistance of the common electrodes 103 is sufficiently low, the common electrodes 103 can serve also as the common electrode wiring 120 located as the lowest layer. In this case, the formation of the common electrode wiring 120 located as the lowest layer and the fabrication of the through-hole accompanying the aforesaid formation can be omitted.

In the present embodiment, as shown in FIG. 4(a), each pixel is formed in a region surrounded by the common electrodes 103 formed in the form of a lattice and is located so as to be divided into four regions, inclusive of the pixel electrode 105. Each pixel has a zigzag crooked structure in which the pixel electrode 105 and the common electrode 103 facing the pixel electrode 105 are located in parallel with each other. Each pixel forms two or more sub-pixels. Thus, a structure is formed in which a tone change in a plane is compensated for.

Third Embodiment

Figure 5:
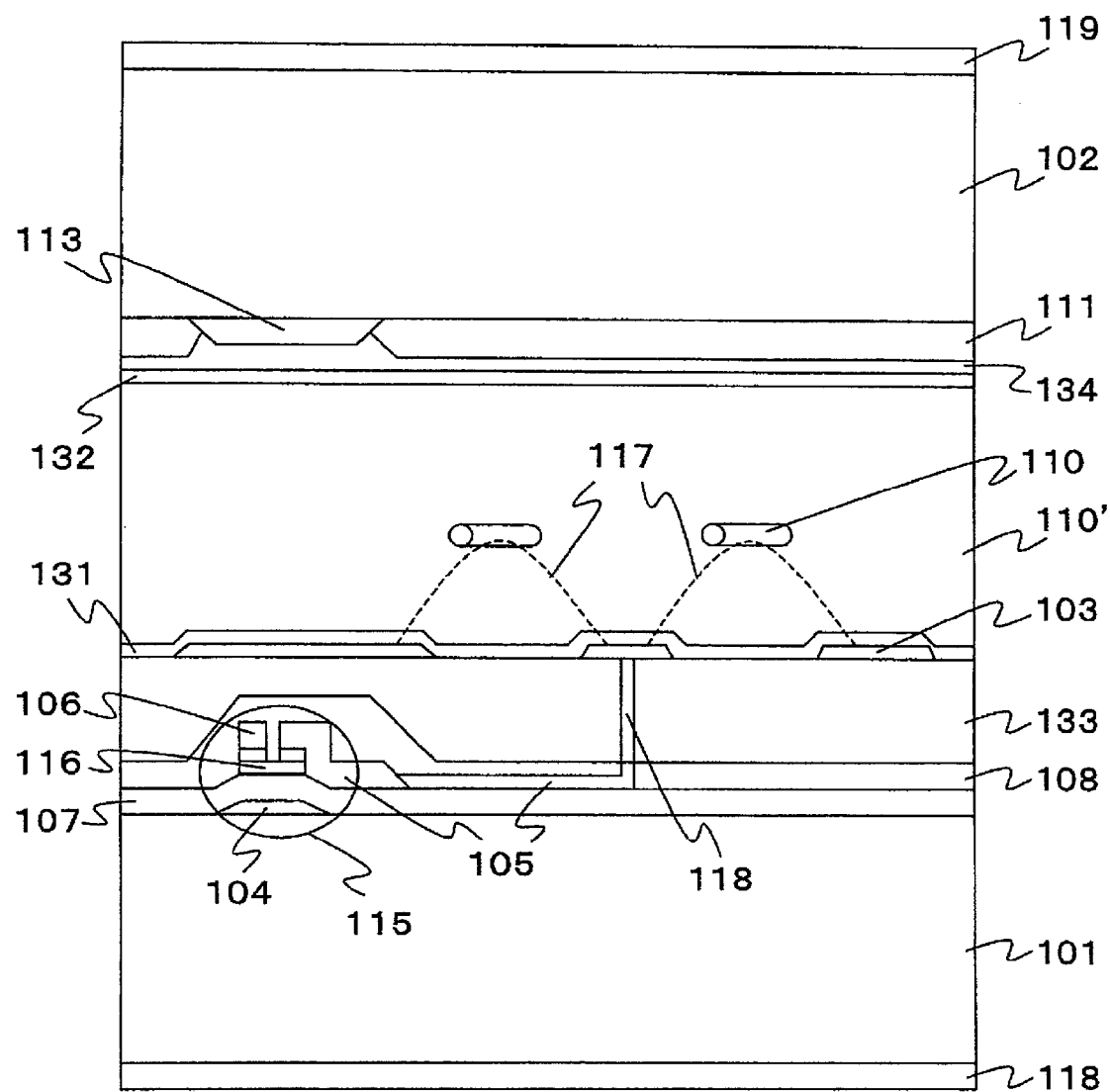
FIG. 5 is a cross-sectional view of a pixel portion in a third embodiment of the liquid crystal display device of the present invention.

FIG. 5 is a schematic cross-sectional view of the vicinity of a pixel which illustrates a third embodiment of the liquid crystal display device of the present invention. In FIG. 5, the same symbols as in the drawings in the embodiments described above correspond to the same functional portions as in these embodiments. As shown in FIG. 5, in the present embodiment, a pixel electrode 105 located under a protective film 108 is drawn up to the surface of an organic insulating film 133 through a through-hole 118 to be located at the same level as that of common electrodes 103. When this structure is used, a voltage for driving liquid crystals can be further reduced.

Forth Embodiment

Figure 6:
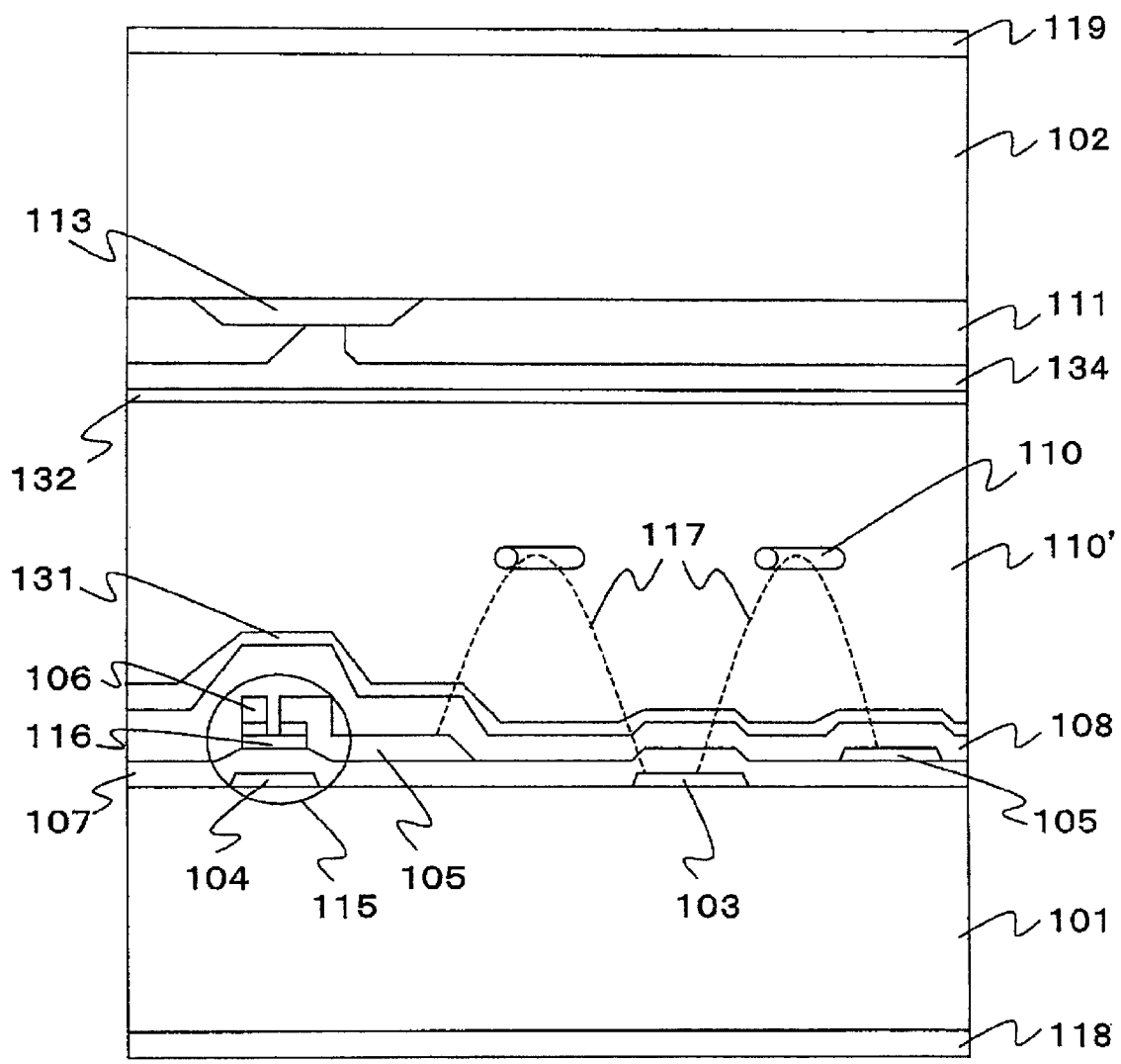
FIG. 6 is a cross-sectional view of a pixel portion in a fourth embodiment of the liquid crystal display device of the present invention.

FIG. 6 is a schematic cross-sectional view of the vicinity of a pixel which illustrates a fourth embodiment of the liquid crystal display device of the present invention. In FIG. 6, the same symbols as in the drawings in the embodiments described above correspond to the same functional portions as in these embodiments. In the present embodiment, a structure having great level differences due to electrodes and the like is employed.

Fifth Embodiment

Figure 7:
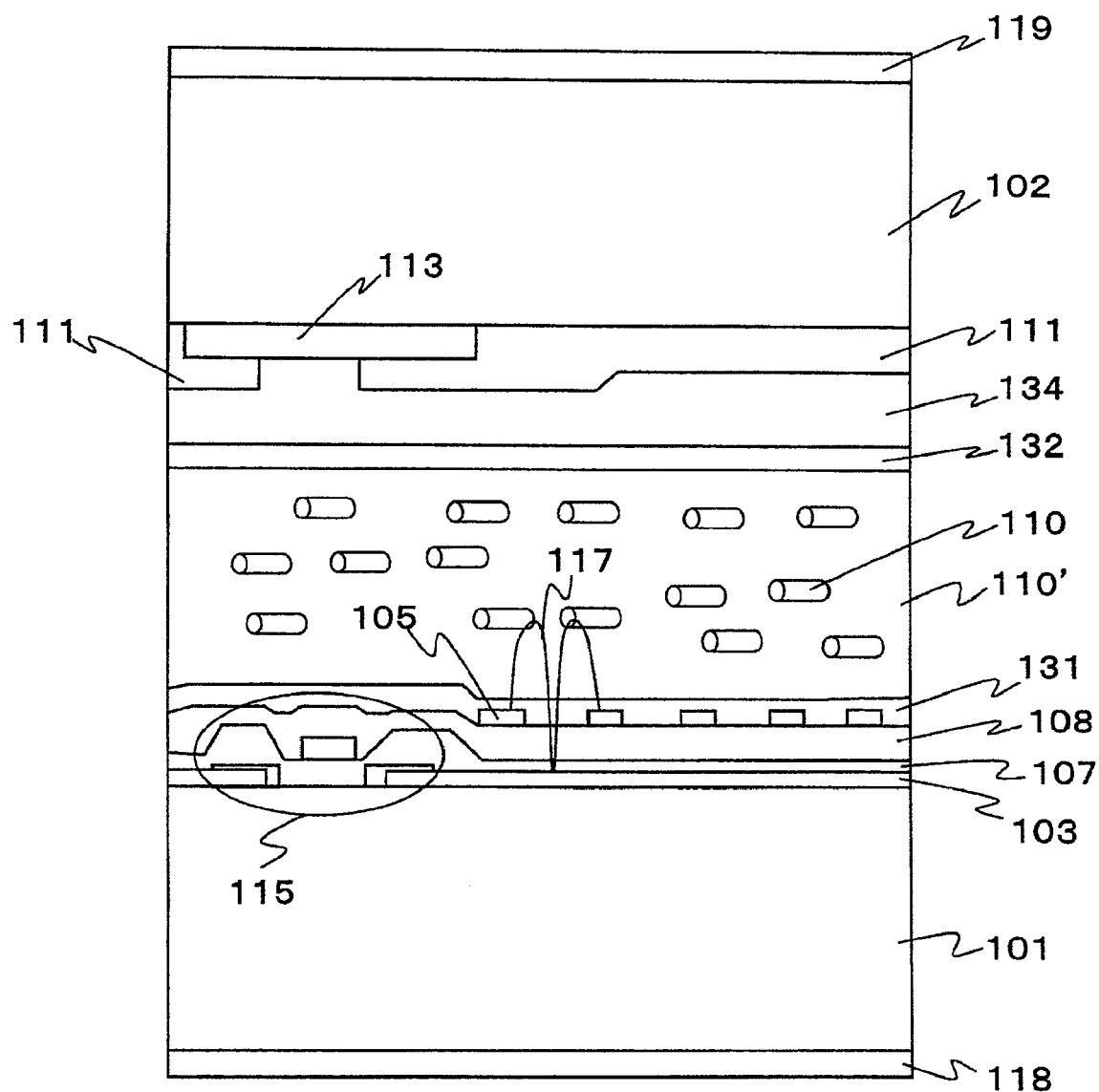
FIG. 7 is a cross-sectional view of a pixel portion in a fifth embodiment of the liquid crystal display device of the present invention.

FIG. 7 is a schematic cross-sectional view of the vicinity of a pixel which illustrates a fifth embodiment of the liquid crystal display device of the present invention. In FIG. 7, the same symbols as in the drawings in the embodiments described above correspond to the same functional portions as in these embodiments. In the present embodiment, pixel electrodes 105 and a common electrode 103 are formed of ITO, and the common electrode 103 is composed of a solid electrode covering substantially the whole pixel. Owing to such a structure, the portion over the electrodes can be utilized as a transmission portion, so that the aperture ratio can be improved. Moreover, the distance between the electrodes can be reduced, so that an electric field can be efficiently applied to liquid crystals.

In the thus constructed TFT liquid crystal display device, when no electric field is applied, liquid crystal molecules 110 constituting a liquid crystal composition layer 110' become substantially parallel to the surfaces of glass substrates 101 and 102 located so as to face each other, and are homogeneously oriented in an initial direction of orientation determined by photo-alignment treatment. When a thin-film transistor (TFT) 115 is switched on by applying a voltage to a gate electrode 104, an electric field 117 is applied to the liquid crystal composition layer 110' owing to the electric potential difference between the pixel electrodes 105 and the common electrode 103, and the liquid crystal molecules 110 turn in the direction of the electric field owing to the interaction between the dielectric anisotropy of the liquid crystal composition and the electric field. In this case, the light transmittance of the liquid crystal display device is varied by the refraction anisotropy of the liquid crystal composition layer 110' and the action of polarizing plates 118 and 119, whereby display can be carried out.

In each of the embodiments of the present invention described above, two or more groups of display regions consisting of a common electrode(s) and a pixel electrode(s) in each pixel can be provided. By thus providing the two or more groups, the distance between the pixel electrode and the common electrode can be reduced, so that a voltage to be applied for driving liquid crystals can be reduced.

In each of the embodiments of the present invention described above, although a material for a transparent electroconductive film constituting at least one of the pixel electrode and the common electrode is not particularly limited, it is preferable to use a transparent electroconductive film of an ion-doped titanium oxide (e.g. indium-tin-oxide (ITO)) or an ion-doped zinc oxide, in view of ease of processing, reliability and the like.

The following is known: in general, in the IPS method, a boundary-surface tilt with respect to the surface of a substrate is unnecessary in principle unlike in a longitudinal electric field method represented by a conventional TN method, and visual characteristics are improved with a decrease of a boundary-surface tilt angle. Also in a photo-alignment film, a small boundary-surface tilt angle is preferable, and a boundary-surface tilt angle of 1 degree or less is especially effective.

Next, the formation of an alignment film using a rubbing-less alignment method for a film for controlling the orientation of liquid crystal molecules is explained below as a step in a process for producing the liquid crystal display device of the present invention. The order of steps for forming the alignment film according to the present invention is as described in the following items (1) to (4): (1) the formation of a coating film as alignment film (a uniform coating film is formed all over a display region), (2) calcination for conversion to imide of the alignment film (the removal of a varnish solvent and conversion to a highly heat-resistant polyimide are accelerated), (3) the impartment of an ability to orient liquid crystal molecules by irradiation with polarized light (an uniform orienting ability is imparted to the display region), and (4) the enhancement and stabilization of the orienting ability by (heating, irradiation with infrared rays, irradiation with far infrared rays, irradiation with electron rays or irradiation with radiation).

The alignment film is formed by a process consisting of the above 4 steps. The order of the steps is not limited to the order of (1) to (4) in the process. A larger effect is expected in the following cases (I) and (II). (I) The above steps (3) and (4) are carried out so as to overlap with each other with respect to time, to accelerate the impartment of the ability to orient liquid crystal molecules, and induce crosslinking reaction or the like, whereby more effective formation of the alignment film becomes possible. (II) When the heating, irradiation with infrared rays, irradiation with far infrared rays, or the like in the above step (4) is employed, the above step (4) becomes able to serve also as the step (2), i.e., the conversion to imide when the above steps (2), (3) and (4) are allowed to overlap with respect to time, whereby it becomes possible to form the alignment film in a short time.

Specific examples of a process for producing the liquid crystal display device of the present invention are described below.

EXAMPLE 1

This example corresponds to the liquid crystal display device explained in the first embodiment described above. This example is explained in detail with reference to FIG. 1 and FIG. 2.

In the production of the liquid crystal display device of this example, a glass substrate of 0.7 mm in thickness whose surface had been polished was used as each of a glass substrate 101 for forming an active-matrix substrate, and a glass substrate 102 for forming a color filer substrate facing the active-matrix substrate. An acrylic resin organic insulating film 134 of 1.0 µm in thickness was formed on the color filter substrate side.

A thin-film transistor 115 to be formed on the glass substrate 101 was composed of a source electrode 105, a drain electrode 106, a gate electrode 104 and amorphous silicon as semiconductor layer 116.

All of a scanning wiring 104, a common electrode wiring 120, a signal wiring 106 and pixel electrodes 105 were formed by patterning a chromium film, and the distance between the pixel electrode 105 and the common electrode 103 was adjusted to 7 µm. For forming the common electrodes 103 and the pixel electrodes 105, the chromium film was used which had a low resistance and was easily patterned. It is also possible to attain higher luminance characteristics by forming the common electrodes 103 and the pixel electrodes 105 from a transparent electrode obtained by using an ITO film.

A gate insulating film 107 and a protective insulating film 108 were made of silicon nitride and the thickness of each of these films was adjusted to 0.3 µm. An acrylic resin was applied on them and heat-treated at 220° C. for 1 hour to form an organic insulating film 133 of 1.5 µm in thickness which was transparent and had insulating properties.

Then, as shown in FIG. 2(c), a through-hole 118 was formed as far as a common electrode wiring 120 by photolithography and etching treatment, and the common electrodes 103 connecting to the common electrode wiring 120 were formed by patterning.

As a result, in a unit pixel (a single pixel), the pixel electrode 105 was located among three of the common electrodes 103 as shown in FIG. 2(a), whereby there was formed an active-matrix substrate having pixels in a number of 1024× 3×768, namely, pixels composed of signal wirings 106 in a number of 1024×3 (corresponding to R, G and B) and 768 scanning wirings 104.

Thereafter, a poly(amic acid) varnish consisting of a 1:1 (by mole) mixture of p-phenylenediamine as diamine compound and 1,4-diaminopyridine and 1,2,3,4-cyclobutanetetracarboxylic dianhydride as acid dianhydride was adjusted so as to have a resin concentration of 5% by weight, a NMP concentration of 60% by weight, a γ-butyllactone concentration of 20% by weight and a butyl Cellosolve concentration of 15% by weight, and it was formed by printing on the above-mentioned active-matrix substrate and subjected to conversion to imide by heat treatment at 220° C. for 30 minutes. Thus, a dense polyimide alignment film 131 of about 80 nm was formed.

Subsequently, C.I. Direct Red 81 and C.I. Direct Yellow 12 were added to a poly(amic acid) varnish consisting of a 1:1 (by mole) mixture of p-phenylenediamine as diamine compound and 1,4-diaminopyridine and 1,2,3,4-cyclobutanetetracarboxylic dianhydride as acid dianhydride, and the resulting mixture was adjusted so as to have a resin concentration of 5% by weight, a C.I. Direct Red 81 concentration of 0.7% by weight, a C.I. Direct Yellow 12 concentration of 0.3% by weight, a NMP concentration of 60% by weight, a Y-butyllactone concentration of 20% by weight and a butyl Cellosolve concentration of 14% by weight. This mixture was formed by printing and heat-treated at 220° C. for 30 minutes to form an alignment film 132 composed of a dense polyimide film of about 80 nm on the surface of the other glass substrate 102.

The surfaces of the alignment films 131 and 132 were irradiated with polarized UV (ultraviolet) light in order to impart an ability to orient liquid crystal molecules and anisotropic absorption. A high-pressure mercury lamp was used as a light source, and UV light in the range of 240 nm to 600 nm was taken out through an interference filter and made into linear polarized light having a polarization ratio of approximately 10:1 by the use of a pile polarizer obtained by laminating quartz substrates. The linear polarized light was cast at an irradiation energy of about 5 J/cm². As a result, the direction of orientation of liquid crystal molecules on the surfaces of the alignment films was found to be perpendicular to the direction of polarization of the polarized UV cast.

Then, the two glass substrates 101 and 102 were located so that their surfaces having the alignment films 131 and 132, respectively, having an ability to orient liquid crystal molecules might face each other. A spacer composed of dispersed spherical polymer beads was placed between the these surfaces and a sealing compound was applied on the peripheral portion of the resulting assembly to construct a liquid crystal display panel (referred to also as a cell) to be made into a liquid crystal display device.

The directions of orientation of liquid crystal molecules on the two glass substrates, respectively, were substantially parallel to each other and the angle between these directions and the direction of an applied electric field was adjusted to 75°. A nematic liquid crystal composition having a positive dielectric anisotropy $\Delta\epsilon$ of 10.2 (1 kHz, 20° C.), a refractive index anisotropy $\Delta n$ of 0.075 (wavelength 590 nm, 20° C.), a torsional modulus K2 of 7.0 pN and a nematic-isotropic phase transition temperature T(N-I) of about 76° C. was injected into the cell in a vacuum, and the cell was sealed with a sealing compound comprising a ultraviolet-setting resin. Thus, a liquid crystal panel having a thickness of liquid crystal layer (a gap) of 4.2 µm was produced.

The retardation ($\Delta nd$) of this liquid crystal display panel was about 0.31 µm. A liquid crystal display panel having homogeneous orientation was produced by the use of the same alignment films and liquid crystal composition as used in the above-mentioned panel and the pre-tilt angle of the liquid crystals was measured by a crystal rotation method and found to be about 0.2 degree. This liquid crystal display panel was held between two polarizing plates 118 and 119, so that the axis of polarized light transmission of one of the polarizing plates might be substantially parallel to the above-mentioned direction of orientation of liquid crystal molecules and that of the other polarizing plate might be perpendicular thereto. In this case, the axis of absorption of the polarizing plate 119 located on the glass substrate 102 on the observer side was substantially perpendicular to the direction of the axis of absorption of the alignment film 132 formed on the color filter substrate.

Thereafter, a driving circuit, a backlight as light source and the like were connected to the thus obtained assembly to obtain a module, whereby an active-matrix type liquid crystal display device was obtained. In the present embodiment, normally close characteristics were attained which were such that a dark display is obtained at a low voltage and a light display at a high voltage.

Then, the display quality of the liquid crystal display device of the present example was evaluated to confirm a high-quality display having a contrast ratio of 520:1 and a wide angle of field of view at the time of displaying a color with an intermediate tone. The difference in chromaticity coordinate between white display and black display was measured to find that $\Delta u'v'$ was 0.038.

Next, for the quantitative measurement of image sticking, i.e., an afterimage in the liquid crystal display device of the present example, evaluation was carried out by the use of an oscilloscope comprising a combination of photodiodes. At first, a window pattern was displayed on the screen at the highest luminance for 30 minutes. Then, the whole screen was changed so that a display of a color with an intermediate tone, in which an afterimage was most conspicuous, might be obtained, namely, the luminance might be 10% of the highest luminance, and a time required for the disappearance of the pattern of the edge portion of the window pattern was measured as afterimage relaxation time. An allowable afterimage relaxation time in this case was 5 minutes or less. As a result, the relaxation time of an afterimage was found to be 3 minutes or less in the working temperature range (0° C. to 50° C.). Also in a visual inspection of image quality and afterimage, no display nonuniformity due to image sticking, i.e., an afterimage was not observed at all, namely, high display characteristics could be attained.

It has heretofore been said that photo-alignment permits molecular orientation of liquid crystals but has a lower energy for chaining oriented liquid crystal molecules to the surface of an alignment film than does general rubbing alignment. It is also said that when this anchoring energy is low, the reliability of a liquid crystal display device as product is insufficient. Particularly in the case of homogeneous orientation, it is said that anchoring energy in the direction of azimuth angle is more important than anchoring energy in the direction of polar angle.

Using the same material for alignment film as in the thus obtained liquid crystal display device, a liquid crystal cell was produced by forming an alignment film on each glass substrate and carrying out alignment treatment, by the same process as in the case of the aforesaid liquid crystal display device, followed by encapsulation of the same liquid crystal composition as used in the aforesaid liquid crystal display device. The strength of the torsional bonding of liquid crystal molecules to the surface of the alignment film on the boundary surface between them, i.e., anchoring energy A2 in the direction of azimuth angle was measured by a torque balance method (Hasegawa et al. "Collection of Preliminary Manuscripts for Lectures to the Forum of the Japan Liquid Crystal Society" 3B12 (2001), p. 251) and found to be $6.0 \times 10^{-4}$ N/m.

COMPARATIVE EXAMPLE 1

In Comparative Example 1, a liquid crystal display device was produced in the same manner as in Example 1 except for using as an alignment film 132 the same alignment film as the alignment film 131 in place of the alignment film 132 used in Example 1 and containing C.I. Direct Red 81 and C.I. Direct Yellow 12. The display quality of the liquid crystal display device of Comparative Example 1 was evaluated to find that the contrast ratio was 270:1 and that the chromaticity difference $\Delta u'v'$ between white display and black display was 0.072. Then, an afterimage in the liquid crystal display device of Comparative Example 1 was evaluated in the same manner as in Example 1 to find that the afterimage relaxation time was about 3 minutes. The anchoring energy A2 in the direction of azimuth angle was $4.5 \times 10^{-4}$ N/m.

EXAMPLE 2

In this example, a liquid crystal display device was produced in the same manner as in Example 1 except for changing the acrylic resin composition used in the organic insulating film 134 formed on the color filter substrate side. The acrylic resin composition used in the organic insulating film 134 was changed by adding C.I. Direct Red 81 to a concentration of 0.7% by weight and C.I. Direct Yellow 12 to a concentration of 0.3% by weight.

The display quality of the liquid crystal display device produced in this example was evaluated to find that the contrast ratio was 580:1 and that the chromaticity difference $\Delta u'v'$ between white display and black display was 0.034.

EXAMPLE 3

In this example, a liquid crystal display device was produced in the same manner as in Example 1 except for changing an acrylic resin composition used in the organic insulating film 134 formed on the color filter substrate side, a resist material composition used in a color filter 111 and methods for treating them. An acrylic resin composition for forming an organic insulating film 134 was prepared by adding C.I. Direct Red 81 and C.I. Direct Yellow 12 to the same acrylic resin composition as used in the organic insulating film 134 in Example 1, to concentrations of 0.7% by weight and 0.3% by weight, respectively. In addition, C.I. Direct Yellow 44 was added to a resist material for display of a blue color in the color filter layer 111 to a concentration of 1.5% by weight, C.I. Direct Red 81 was added to a resist material for display of a green color in the color filter layer 111 to a concentration of 1% by weight, and C.I. Direct Blue 151 was added to a resist material for display of a red color in the color filter layer 111 to a concentration of 1% by weight.

Before forming an alignment film 132 on the color filter substrate side, an organic insulating film 134 formed on the color filter substrate side in this example by the use of the composition prepared above was irradiated with polarized UV (ultraviolet) light in order to impart anisotropic absorption to the surface of the organic insulating film 134. A high-pressure mercury lamp was used as a light source, and UV light in the range of 330 nm to 600 nm was taken out through an interference filter and made into linear polarized light having a polarization ratio of approximately 15:1 by the use of a pile polarizer obtained by laminating quartz substrates. The linear polarized light was cast at an irradiation energy of about 5 J/cm$^2$. As a result, it was found that the color filter substrate had an axis of absorption in a direction perpendicular to the direction of polarization of the polarized UV cast. In this case, the polarizing plate 119 on the glass substrate 102 can be omitted.

Thereafter, the alignment film 132 on the color filter substrate side was formed in the same manner as in Example 1. In this case, the axis of polarization of polarized light to be cast on the alignment film 132 was made substantially parallel to the axis of polarization of the polarized light cast on the organic insulating film 134.

The display quality of the liquid crystal display device produced in this example was evaluated to find that the contrast ratio was 630:1 and that the chromaticity difference Δu'v' between white display and black display was 0.027.

EXAMPLE 4

In this example, a liquid crystal display device was produced in the same manner as in Example 1 except for using the same alignment film as the film 132 used on the color filter side in Example 1, as an alignment film 131 on the active-matrix substrate side, and using the same alignment film as the film 131 used on the active-matrix substrate side in Example 1, as an alignment film 132 on the color filter side, and changing an acrylic resin composition used in the organic insulating film 133 formed on the active-matrix substrate side and a method for treating the resin composition.

At first, an acrylic resin composition for forming an organic insulating film 133 was prepared by adding C.I. Direct Red 81 and Brilliant Yellow to the same acrylic resin composition as used in the organic insulating film 133 in Example 1, to concentrations of 0.7% by weight and 0.8% by weight, respectively, and the resulting composition was formed in the same manner as in Example 1.

Then, before forming an alignment film 131 on the active-matrix substrate side, the organic insulating film 133 formed in this example was irradiated with polarized UV (ultraviolet) light in order to impart anisotropic absorption to the surface of the organic insulating film 133. A high-pressure mercury lamp was used as a light source, and UV light in the range of 330 nm to 600 nm was taken out through an interference filter and made into linear polarized light having a polarization ratio of approximately 15:1 by the use of a pile polarizer obtained by laminating quartz substrates. The linear polarized light was cast at an irradiation energy of about 5 J/cm$^2$. As a result, it was found that the active-matrix substrate had an axis of absorption in a direction perpendicular to the direction of polarization of the polarized UV cast. In this case, the polarizing plate 118 on the glass substrate 101 can be omitted.

Thereafter, the alignment film 131 on the active-matrix substrate side was formed in the same manner as in Example 1. In this case, the axis of polarization of polarized light to be cast on the alignment film 131 was made substantially parallel to the axis of polarization of the polarized light cast on organic insulating film 133.

The display quality of the liquid crystal display device produced in this example was evaluated to find that the contrast ratio was 550:1 and that the chromaticity difference Δu'v' between white display and black display was 0.040.

EXAMPLE 5

In this example, a liquid crystal display device was produced in the same manner as in Example 4 except for using the same alignment film as the film 131 used on the active-matrix substrate side in Example 4, as an alignment film 132 on the color filter side.

The display quality of the liquid crystal display device produced in this example was evaluated to find that the contrast ratio was 520:1 and that the chromaticity difference Δu'v' between white display and black display was 0.042.

EXAMPLE 6

The structure of a liquid crystal display device as the fifth embodiment of the present invention is specifically explained as Example 6 with reference to FIG. 7. A glass substrate of 0.7 mm in thickness whose surface had been polished was used as a substrate 101. An insulating film 107 for preventing a short circuit between a common electrode 103 and other electrodes was formed on the substrate 101. In addition, a protective film 108 for protecting a thin-film transistor 115 was formed to obtain a TFT substrate.

The thin-film transistor 115 was composed of a source electrode, a drain electrode, a gate electrode and amorphous silicon formed among them. A scanning wiring to be connected to the gate electrode was formed by patterning an aluminum film, a signal wiring 106 to be connected to the drain electrode was formed by patterning a chromium film, and the common electrode 103 and pixel electrodes 105 were formed by patterning ITO.

The insulating film 107 and the protective film 108 were made of silicon nitride and had thickness values of 0.2 μm and 0.3 μm, respectively. A capacity element was constructed by holding the insulating film 107 and the protective film 108 between the pixel electrodes 105 and the common electrode 103.

The pixel electrodes 105 were located so as to overlap with and exist over the common electrode 103 of solid form. The number of pixels was 1024×3×768, namely, the number of pixels composed of signal wirings in a number of 1024×3 (corresponding to R, G and B) and 768 scanning wirings.

A color filter 111 with a black matrix 113 having the same structure as in Example 1 was formed on a substrate 102 to obtain a color filter substrate.

Then, a poly(amic acid) varnish consisting of a 3:1 (by mole) mixture of p-phenylenediamine as diamine compound and 3,4-diaminothiophene and a 1:1 (by mole) mixture of 1,2,3,4-cyclobutanetetracarboxylic dianhydride and pyromellitic dianhydride as acid dianhydrides was adjusted so as to have a resin concentration of 5% by weight, a NMP concentration of 60% by weight, a γ-butyllactone concentration of 20% by weight and a butyl Cellosolve concentration of 15% by weight, and it was formed by printing on a TFT substrate and subjected to conversion to imide by heat treatment at 220° C. for 30 minutes. Thus, a dense polyimide alignment film 131 of about 110 nm was formed as an alignment film 131 on the TFT substrate side.

Thereafter, C.I. Direct Yellow 44 was dissolved in the same poly(amic acid) varnish as above and the resulting composition was adjusted so as to have a resin concentration of 5% by weight, a C.I. Direct Yellow 44 concentration of 1% by weight, a NMP concentration of 60% by weight, a γ-butyllactone concentration of 20% by weight and a butyl Cellosolve concentration of 14% by weight. This composition was formed by printing and heat-treated at 220° C. for 30 minutes to form an alignment film 132 composed of a dense polyimide film of about 110 nm, as an alignment film 132 on the color filter substrate side.

The surfaces of the alignment films 131 and 132 were irradiated with polarized UV (ultraviolet) light while being irradiated with far infrared rays. A high-pressure mercury lamp was used as a light source, and UV light in the range of 240 nm to 600 nm was taken out through an interference filter and made into linear polarized light having a polarization ratio of approximately 10:1 by the use of a pile polarizer obtained by laminating quartz substrates. The linear polarized light was cast at an irradiation energy of about 3 $J/cm^2$. In this case, the temperature of the alignment films was about 170° C.

The same alignment film as above was formed on a quartz substrate and a polarized UV spectrum was measured. As a result, it was proved that this alignment film had such anisotropic absorption that it had an axis of absorption in a direction perpendicular to polarized UV light cast. In addition, the direction of orientation of liquid crystal molecules on the surfaces of the alignment film was found to be perpendicular to the direction of polarization of the polarized UV cast.

The directions of molecular orientation of the alignment films 131 and 132 on the TFT substrate and the color filter substrate, respectively, were made substantially parallel to each other and the angle between these directions and the direction of an applied electric field 117 was adjusted to 15 degrees. Polymer beads having an average particle size of 4 μm were dispersed as a spacer between these substrates and liquid crystals were held between the TFT substrate and the color filter substrate. As the liquid crystals, a nematic liquid crystal composition having a positive dielectric anisotropy $\Delta\epsilon$ of 10.2 (1 kHz, 20° C.), a refractive index anisotropy $\Delta n$ of 0.075 (wavelength 590 nm, 20° C.), a torsional modulus K2 of 7.0 pN and a nematic-isotropic phase transition temperature T(N-I) of about 76° C. was injected in a vacuum, and the resulting assembly was sealed with a sealing compound comprising a ultraviolet-setting resin. Thus, a liquid crystal panel having a thickness of liquid crystal layer (a gap) of 4.0 μm was produced.

As two polarizing plates 118 and 119 for holding between them the TFT substrate and the color filter substrate, those obtained by adding iodine to a poly(vinyl alcohol), followed by stretching were used and were located in the manner of crossed Nicols. In this case, the axis of absorption of the polarizing plate 119 located on the glass substrate 102 on the observer side was made substantially parallel to the direction of the axis of absorption of the alignment film 132 formed on the color filter substrate. Normally close characteristics were employed which were such that a dark state is assumed at a low voltage and a light state at a high voltage.

The retardation (Δnd) of the thus obtained liquid crystal display panel was about 0.30 μm. A liquid crystal display panel having homogeneous orientation was produced by the use of the same alignment films and liquid crystal composition as used in the above-mentioned panel and the pre-tilt angle of the liquid crystals was measured by a crystal rotation method and found to be about 0.2 degree.

A backlight source was located on the glass substrate 101 side of the above-mentioned liquid crystal display panel and other circuits for driving the liquid crystals were provided to produce a liquid crystal display device.

Then, the display quality of the liquid crystal display device of the present example was evaluated to confirm a high-quality display having a contrast ratio of 620:1 and a wide angle of field of view at the time of displaying a color with a intermediate tone. The difference in chromaticity coordinate between white display and black display was measured to find that Δu'v' was 0.034.

In addition, for the quantitative measurement of image sticking, i.e., an afterimage in the liquid crystal display device of the present example, evaluation was carried out by the use of an oscilloscope comprising a combination of photodiodes. At first, a window pattern was displayed on the screen at the highest luminance for 30 minutes. Then, the whole screen was changed so that a display of a color with an intermediate tone, in which an afterimage was most conspicuous, might be obtained, namely, the luminance might be 10% of the highest luminance, and a time required for the disappearance of the pattern of the edge portion of the window pattern was measured as afterimage relaxation time. An allowable afterimage relaxation time in this case was 5 minutes or less. As a result, the relaxation time of an afterimage was found to be 3 minutes or less in the working temperature range (0° C. to 50° C.). Also in a visual inspection of image quality and afterimage, no display nonuniformity due to image sticking, i.e., an afterimage was not observed at all, namely, high display characteristics could be attained.

It has heretofore been said that photo-alignment permits molecular orientation of liquid crystals but has a lower energy for chaining oriented liquid crystal molecules to the surface of an alignment film than does general rubbing alignment. It is also said that when this anchoring energy is low, the reliability of a liquid crystal display device as product is insufficient. Particularly in the case of homogeneous orientation, it is said that anchoring energy in the direction of azimuth angle is more important than anchoring energy in the direction of polar angle.

Using the same material for alignment film as in the thus obtained liquid crystal display device, a liquid crystal cell was produced by forming an alignment film on each glass substrate and carrying out alignment treatment, by the same process as in the case of the aforesaid liquid crystal display device, followed by encapsulation of the same liquid crystal composition as used in the aforesaid liquid crystal display device. The strength of the torsional bonding of liquid crystal molecules to the surface of the alignment film on the boundary surface between them, i.e., anchoring energy A2 in the direction of azimuth angle was measured by a torque balance method (Hasegawa et al. "Collection of Preliminary Manuscripts for Lectures to the Forum of the Japan Liquid Crystal Society" 3B12 (2001), p. 251) and found to be $7.0 \times 10^{-4}$ N/m.

COMPARATIVE EXAMPLE 2

In Comparative Example 2, a liquid crystal display device was produced in the same manner as in Example 6 except for using the same alignment film as the alignment film 131 in place of the alignment film 132 used in Example 6 and containing C.I. Direct Yellow 44.

The display quality of the liquid crystal display device of Comparative Example 2 was evaluated to find that the contrast ratio was 420:1 and that the chromaticity difference Δu'v' between white display and black display was 0.065.

Then, an afterimage in the liquid crystal display device of Comparative Example 2 was evaluated in the same manner as in Example 6 to find that the afterimage relaxation time was about 5 minutes. The anchoring energy A2 in the direction of azimuth angle was $5.0 \times 10^{-4}$ N/m.

COMPARATIVE EXAMPLE 3

In Comparative Example 3, a liquid crystal display device was produced in the same manner as in Example 6 except for locating the polarizing plate 119 described in Example 6 so that the axis of absorption of the polarizing plate 119 might be perpendicular to that of the alignment film 132, and attaching the polarizing plate 118 and the polarizing plate 119 in the manner of crossed Nicols.

The display quality of the liquid crystal display device produced in Comparative Example 3 was evaluated to find that the contrast ratio was 590:1 and that the chromaticity difference Δu'v' between white display and black display was 0.045.

EXAMPLE 7

In this example, a liquid crystal display device was produced in the same manner as in Example 6 except for using the same alignment film as the alignment film 132 used in the color filter substrate side in Example 6, also as an alignment film 131 on the active-matrix substrate side.

The display quality of the liquid crystal display device produced in this example was evaluated to find that the contrast ratio was 690:1 and that the chromaticity difference Δu'v' between white display and black display was 0.035.

Then, an afterimage in the liquid crystal display device of this example was evaluated in the same manner as in Example 6 to find that the afterimage relaxation time was about 1 minute. The anchoring energy A2 in the direction of azimuth angle was $1.0 \times 10^{-3}$ N/m.

COMPARATIVE EXAMPLE 4

In Comparative Example 4, a liquid crystal display device was produced in the same manner as in Example 7 except for adopting a rubbing alignment method as an alignment treatment method.

The display quality of the liquid crystal display device of Comparative Example 4 was evaluated to find that the contrast ratio was 380:1 and that the chromaticity difference Δu'v' between white display and black display was 0.098.

Then, an afterimage in the liquid crystal display device of Comparative Example 4 was evaluated in the same manner as in Example 6 to find that the afterimage relaxation time was about 2 minutes. The anchoring energy A2 in the direction of azimuth angle was $9.0 \times 10^{-4}$ N/m.

EXAMPLE 8

In this example, a liquid crystal display device was produced in the same manner as in Example 6 except for using the same alignment film as the alignment film 132 used on the color filter substrate side in Example 6, as an alignment film 131 on the active-matrix substrate side, and using the same alignment film as the alignment film 131 used on the TFT substrate side in Example 6, as an alignment film 132 on the color filter substrate side.

The display quality of the liquid crystal display device produced in this example was evaluated to find that the contrast ratio was 610:1 and that the chromaticity difference Δu'v' between white display and black display was 0.044.

Then, an afterimage in the liquid crystal display device of this example was evaluated in the same manner as in Example 6 to find that the afterimage relaxation time was about 1 minute. The anchoring energy A2 in the direction of azimuth angle was $9.0 \times 10^{-4}$ N/m.

EXAMPLE 9

In Example 9, a liquid crystal display device was produced in the same manner as in Example 6 except for changing an acrylic resin composition used in the organic insulating film 134 formed on the color filter substrate side, a resist material composition used in the color filter 111 and methods for treating them.

At first, an acrylic resin composition for forming an organic insulating film 134 was prepared by adding C.I. Direct Red 81 and C.I. Direct Yellow 12 to the same acrylic resin composition as used in the organic insulating film 134 in Example 6, to concentrations of 0.7% by weight and 0.3% by weight. In addition, C.I. Direct Yellow 44 was added to a resist material for display of a blue color in the color filter layer 111 to a concentration of 1.5% by weight.

Before forming an alignment film 132 on the color filter substrate side, an organic insulating film 134 formed on the color filter substrate side in this example by the use of the composition prepared above was irradiated with polarized UV (ultraviolet) light in order to impart anisotropic absorption to the surface of the organic insulating film 134. A high-pressure mercury lamp was used as a light source, and UV light in the range of 340 nm to 650 nm was taken out through an interference filter and made into linear polarized light having a polarization ratio of approximately 15:1 by the use of a pile polarizer obtained by laminating quartz substrates. The linear polarized light was cast at an irradiation energy of about 5 J/cm². As a result, it was found that the color filter substrate had an axis of absorption in a direction perpendicular to the direction of polarization of the polarized UV cast.

Thereafter, the alignment film 132 on the color filter substrate side was formed in the same manner as in Example 6. In this case, the axis of polarization of polarized light to be cast on the alignment film 132 was made substantially parallel to the axis of polarization of the polarized light cast on organic insulating film 134.

The display quality of the liquid crystal display device produced in this example was evaluated to find that the contrast ratio was 740:1 and that the chromaticity difference Δu'v' between white display and black display was 0.029.

EXAMPLE 10

In this example, a liquid crystal display device was produced in the same manner as in Example 6, except that a composition obtained by adding 0.5% by weight of Brilliant Yellow, 0.1% by weight of C.I. Direct Red 28 and 0.1% by weight of C.I. Direct Blue 1 to the same poly(amic acid) varnish as in Example 6 was used in an alignment film 132 on the color filter substrate side.

The display quality of the liquid crystal display device produced in this example was evaluated to find that the contrast ratio was 720:1 and that the chromaticity difference Δu'v' between white display and black display was 0.031.

EXAMPLE 11

In Example 11, a liquid crystal display device corresponding to the fourth embodiment of the present invention was produced. FIG. 6 is a schematic cross-sectional view of the vicinity of a pixel which illustrates this example.

In the production of the liquid crystal display device of this example, a glass substrate of 0.7 mm in thickness whose surface had been polished was used as each of glass substrates 101 and 102. A thin-film transistor 115 was composed of a source electrode 105, a drain electrode 106, a gate electrode 104 and amorphous silicon 116.

All of the gate electrode (scanning wiring) 104, a common electrode wiring to be connected to a common electrode 103, the drain electrode (signal wiring) 106, the source electrodes (pixel electrodes) 105 and the common electrode 103 were formed by patterning a chromium film, and the distance between the pixel electrode 105 and the common electrode 103 was adjusted to 7 μm. A gate insulating film 107 and a protective film 108 were made of silicon nitride and the thickness of each of them was adjusted to 0.3 μm. The same alignment films 131 and 132 as in Example 10 were used and they were formed through the same steps as in Example 10.

The display quality of the liquid crystal display device produced in this example was evaluated to find that the contrast ratio was 630:1 and that the chromaticity difference Δu'v' between white display and black display was 0.030.

COMPARATIVE EXAMPLE 5

In Comparative Example 5, a liquid crystal display device was produced in the same manner as in Example 11 except for adopting rubbing alignment as an alignment treatment method for the alignment films 131 and 132. The display quality of the liquid crystal display device produced in Comparative Example 5 was evaluated to find that the contrast ratio was 290:1 and that the chromaticity difference Δu'v' between white display and black display was 0.046.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A liquid crystal display device comprising:
a pair of substrates,
a polarizing plate located on at least one of the pair of said substrates,
a liquid crystal layer located between the pair of said substrates,
a group of electrodes formed on at least one of the pair of said substrates and used for applying an electric field to said liquid crystal layer,
a pair of alignment films formed on the pair of said substrates, respectively, and
a light source located outside the pair of said substrates, wherein an alignment film formed on a substrate on an observer side is made of a material obtained by adding a photoisomerized compound to a photosensitive polymer and has an anisotropic absorption all over a visible light wavelength region, wherein an axis of absorption of the alignment film formed on the substrate on the observer side is substantially parallel to an axis of absorption of the polarizing plate located on the substrate on the observer side, and wherein the photosensitive polymer and the photoisomerized compound are endowed with an orientation-controlling ability by irradiation with a polarized light.

2. A liquid crystal display device according to claim 1, wherein an alignment film formed on a substrate on a light source side is made of a material obtained by adding a photoisomerized compound to a photosensitive polymer and has an anisotropic absorption all over the visible light wavelength region.

3. A liquid crystal display device according to claim 1, wherein at least one organic insulating film is formed on the substrate on the observer side between the pair of said substrates, and at least one of said organic insulating film is made of a material obtained by adding a photoisomerized compound to a photosensitive polymer and has an anisotropic absorption all over the visible light wavelength region.

4. A liquid crystal display device according to claim 3, wherein an axis of absorption of the alignment film formed on the substrate on the observer side is parallel to an axis of absorption of the organic insulating film formed on the substrate on the observer side.

5. A liquid crystal display device according to claim 1, wherein at least one organic insulating film is formed on the substrate on the light source side between the pair of said substrates, and at least one of said organic insulating film is made of a material obtained by adding a photoisomerized compound to a photosensitive polymer and has an anisotropic absorption all over the visible light wavelength region.

6. A liquid crystal display device according to claim 5, wherein an axis of absorption of the alignment film formed on the substrate on the observer side is parallel to an axis of absorption of the organic insulating film formed on the substrate on the light source side.

7. A liquid crystal display device according to claim 1, wherein an axis of absorption of the alignment film formed on substrate on the observer side is parallel to an axis of absorption of the alignment film formed on the substrate on the light source side.

8. A liquid crystal display device according to claim 1, wherein the photosensitive polymer is a photosensitive polyimide and/or a photosensitive poly (amic acid), including cyclobutane rings.

9. A liquid crystal display device according to claim 1, wherein the anisotropic absorption of said alignment films and an organic insulating layer formed on the substrate on the observer side are imparted by irradiation with a substantially linearly polarized light.

10. A liquid crystal display device according to claim 1, wherein the electric field to be applied to said liquid crystal layer has a component substantially parallel to the pair of the substrates.

11. A liquid crystal display device according to claim 1, wherein the degree of the anisotropic absorption in the wavelength range of 400 nm to 500 nm is higher than the degree of the anisotropic absorption in the wavelength range of 500 nm to 750 nm.

12. A liquid crystal display device according to claim 1, wherein the photoisomerized compound is composed of an azobenzene derivative and/or a stilbene derivative.

13. A liquid crystal display device according to claim 1, further comprising a color filter which includes the photoisomerized compound.

14. A liquid crystal display device comprising:
a pair of substrates,
a polarizing plate located on at least one of the pair of said substrates,
a liquid crystal layer located between the pair of said substrates,
a group of electrodes formed on at least one of the pair of said substrates and used for applying an electric field to said liquid crystal layer,
a pair of alignment films formed on the pair of said substrates, respectively, and
a light source located outside the pair of said substrates,
wherein an alignment film formed on a substrate on a light source side is made of a material obtained by adding a photoisomerized compound to a photosensitive polymer and has an anisotropic absorption all over a visible light wavelength region,
wherein an axis of absorption of the alignment film formed on the substrate on the light source side is substantially parallel to an axis of absorption of the polarizing plate located on the substrate on the light source side, and
wherein the photosensitive polymer and the photoisomerized compound are endowed with an orientation-controlling ability by irradiation with a polarized light.

15. A liquid crystal display device according to claim 14, wherein at least one organic insulating film is formed on a substrate on an observer side between the pair of said substrates, and at least one of said organic insulating film is made of a material obtained by adding a photoisomerized compound to a photosensitive polymer, and has an anisotropic absorption all over the visible light wavelength region.

16. A liquid crystal display device according to claim 15, wherein an axis of absorption of the alignment film formed on the substrate on the light source side is parallel to an axis of absorption of the organic insulating film formed on the substrate on the observer side.

17. A liquid crystal display device according to claim 14, wherein at least one organic insulating film is formed on a substrate on the light source side between the pair of said substrates, and at least one of said organic insulating film is made of a material obtained by adding a photoisomerized compound to a photosensitive polymer and has an anisotropic absorption all over the visible light wavelength region.

18. A liquid crystal display device according to claim 17, wherein an axis of absorption of the alignment film formed on the substrate on the observer side is parallel to an axis of absorption of the alignment film formed on the substrate on the light source side.

19. A liquid crystal display device according to claim 14, wherein the alignment film formed on the substrate on the observer side is made of a material obtained by adding a photoisomerized compound to a photosensitive polymer, and wherein an axis of absorption of the alignment film formed on the substrate on the observer side is parallel to an axis of absorption of the alignment film formed on the substrate on the light source side.

20. A liquid crystal display device according to claim 14, wherein the alignment film contains a resin and the photoisomerized compound is contained in an amount of 20% by weight or less based on the resin.

* * * * *